United States Patent
Morita et al.

(10) Patent No.: US 10,153,859 B2
(45) Date of Patent: Dec. 11, 2018

(54) MOBILE COMMUNICATION SYSTEM, COMMUNICATION CONTROL METHOD, BASE STATION SUPERPOSING AN INTERFERENCE REPLICA SIGNAL TO A DESIRED WAVE SIGNAL, AND USER TERMINAL PERFORMING INTERFERENCE CANCELLATION

(71) Applicant: KYOCERA CORPORATION, Kyoto (JP)

(72) Inventors: Kugo Morita, Yokohama (JP); Chiharu Yamazaki, Tokyo (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/417,013

(22) Filed: Jan. 26, 2017

(65) Prior Publication Data
US 2017/0141868 A1    May 18, 2017

Related U.S. Application Data

(62) Division of application No. 14/654,489, filed as application No. PCT/JP2013/080294 on Nov. 8, 2013, now Pat. No. 9,621,284.
(Continued)

(51) Int. Cl.
*H04J 11/00* (2006.01)
*H04B 15/00* (2006.01)
(Continued)

(52) U.S. Cl.
CPC ......... *H04J 11/0056* (2013.01); *H04B 7/024* (2013.01); *H04B 15/00* (2013.01);
(Continued)

(58) Field of Classification Search
CPC ....... H04B 15/00; H04B 7/024; H04J 11/004; H04J 11/0053; H04J 11/003;
(Continued)

(56) References Cited

U.S. PATENT DOCUMENTS

2009/0274086 A1* 11/2009 Petrovic ............... H04J 11/0093
                                                           370/312
2012/0069784 A1    3/2012 Kim et al.
(Continued)

FOREIGN PATENT DOCUMENTS

JP    2013-219459 A    10/2013

OTHER PUBLICATIONS

International Search Report; issued in PCT/JP2013/080294; dated Feb. 10, 2014.
(Continued)

*Primary Examiner* — Alejandro Rivero
(74) *Attorney, Agent, or Firm* — Studebaker & Brackett PC

(57) ABSTRACT

A mobile communication system comprises: a user terminal that receives a desired wave signal from a serving cell while receiving an interference wave signal from a neighboring cell adjacent to the serving cell; and a base station that manages the serving cell. The base station comprises: a controller that generates an interference replica signal corresponding to the interference wave signal and superposes the interference replica signal on the desired wave signal; and a transmitter that transmits the desired wave signal superposed with the interference replica signal to the user terminal The controller generates the interference replica signal such that the interference replica signal cancels the interference wave signal in a location of the user terminal. The interference replica signal acts as a disturbing signal, (Continued)

which disturbs demodulation of the desired wave signal, in a location other than the location of the user terminal.

3 Claims, 22 Drawing Sheets

Related U.S. Application Data

(60) Provisional application No. 61/740,989, filed on Dec. 21, 2012, provisional application No. 61/745,016, filed on Dec. 21, 2012, provisional application No. 61/745,043, filed on Dec. 21, 2012.

(51) Int. Cl.
*H04W 16/28* (2009.01)
*H04L 5/00* (2006.01)
*H04B 7/024* (2017.01)
*H04L 1/00* (2006.01)
*H04W 84/04* (2009.01)
*H04L 27/38* (2006.01)

(52) U.S. Cl.
CPC ........... *H04J 11/003* (2013.01); *H04J 11/005* (2013.01); *H04L 1/00* (2013.01); *H04L 5/00* (2013.01); *H04L 5/005* (2013.01); *H04L 5/0035* (2013.01); *H04W 16/28* (2013.01); *H04L 5/0007* (2013.01); *H04L 27/38* (2013.01); *H04W 84/042* (2013.01)

(58) Field of Classification Search
CPC ..... H04L 5/0007; H04L 27/38; H04L 5/0073; H04L 5/00; H04L 5/0035; H04L 5/0048; H04W 16/28; H04W 84/042; H04W 72/082
See application file for complete search history.

(56) References Cited

U.S. PATENT DOCUMENTS

| | | | |
|---|---|---|---|
| 2012/0087266 A1 | 4/2012 | Vajapeyam et al. | |
| 2012/0155411 A1* | 6/2012 | Ancora | H04J 11/0056 370/329 |
| 2013/0077578 A1* | 3/2013 | Wang | H04W 72/1278 370/329 |
| 2013/0107823 A1* | 5/2013 | Damnjanovic | H04W 52/16 370/329 |
| 2015/0016419 A1* | 1/2015 | Kim | H04W 36/04 370/331 |

OTHER PUBLICATIONS

Written Opinion; issued in PCT/JP20131080294; dated Feb. 10, 2014.

3rd Generation Partnership Project; Technical Specification Group Radio Access Network; Coordinated multi-point operation for LTE physical layer aspects; 3GPP TR 36.819 V11.1.0; Dec. 2011; pp. 1-69; Release 11; 3GPP Organizational Partners.

* cited by examiner

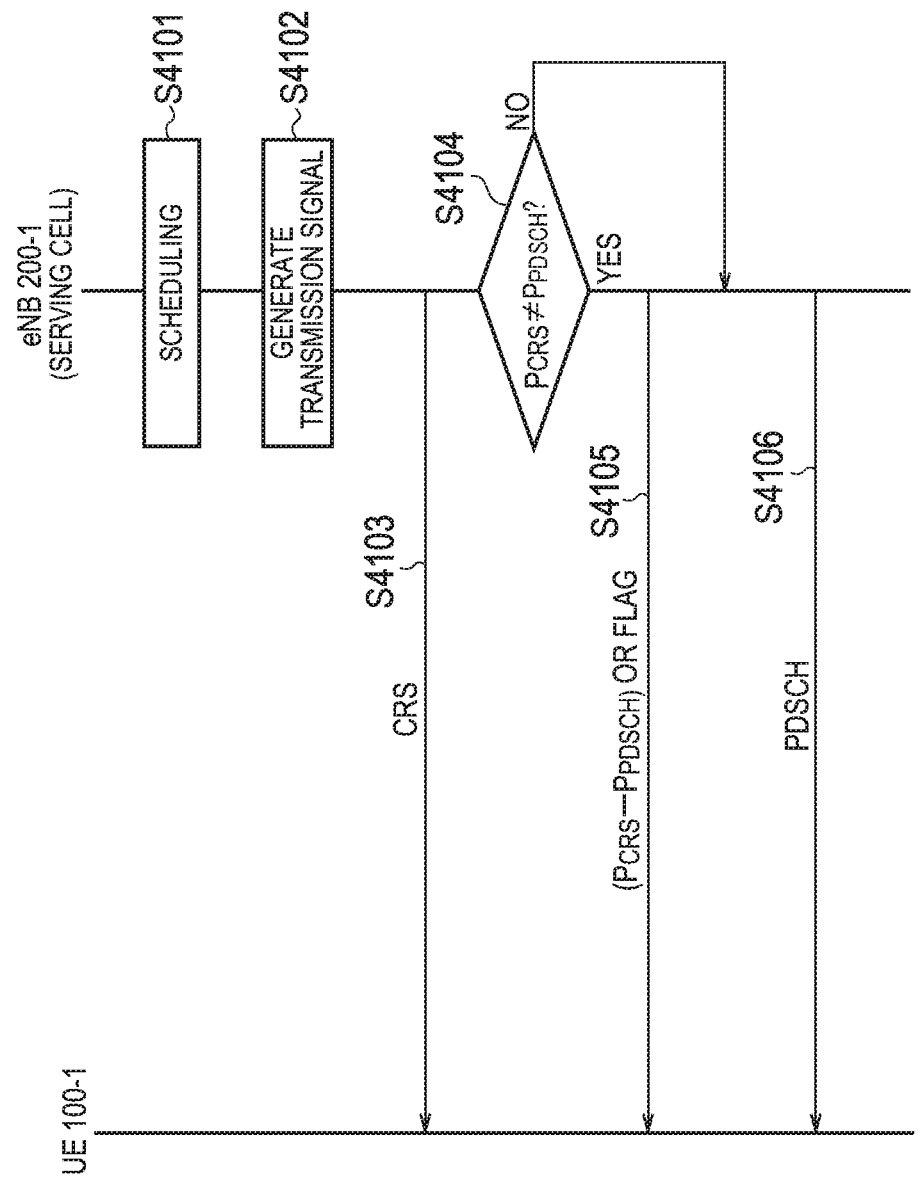

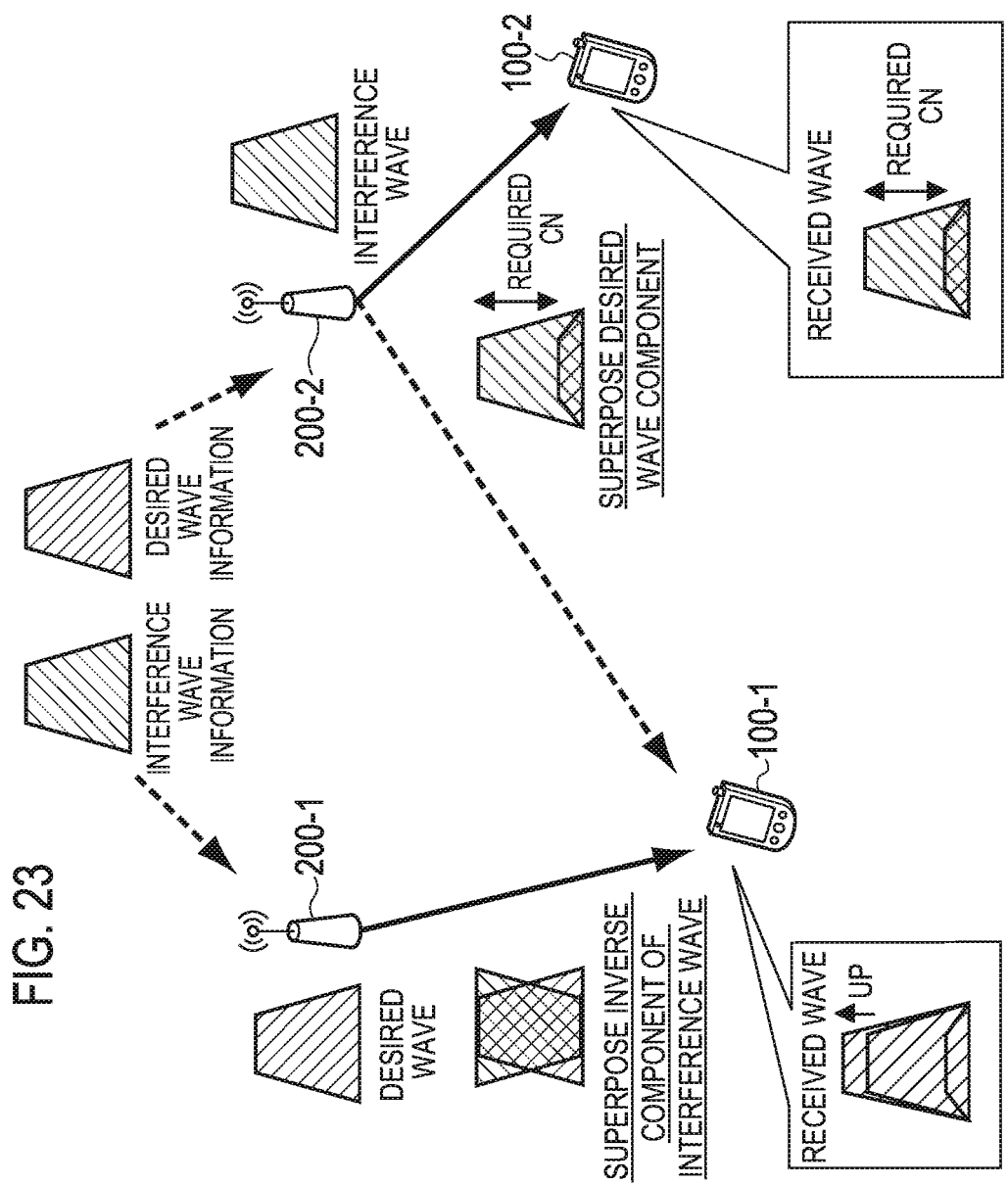

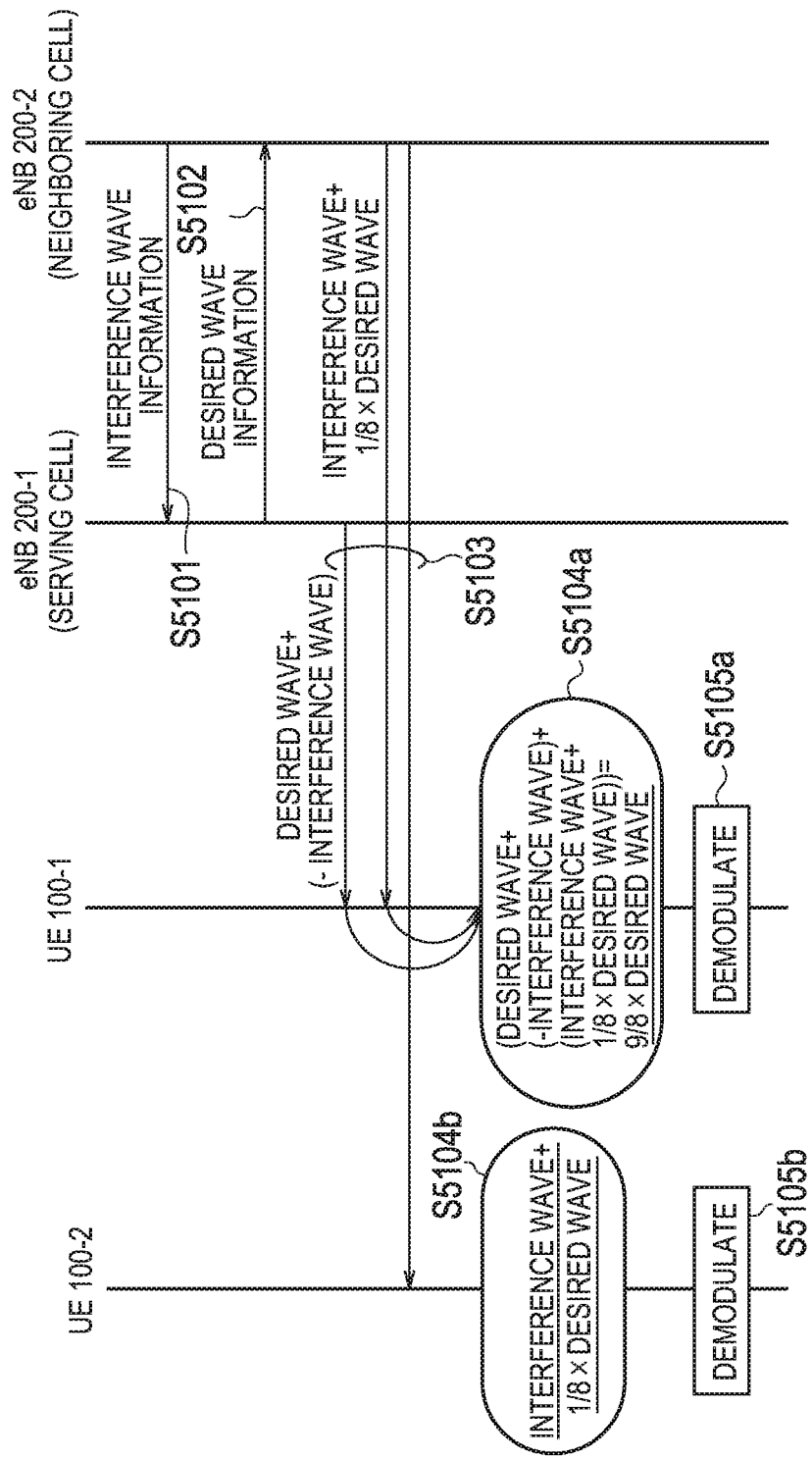

MOBILE COMMUNICATION SYSTEM, COMMUNICATION CONTROL METHOD, BASE STATION SUPERPOSING AN INTERFERENCE REPLICA SIGNAL TO A DESIRED WAVE SIGNAL, AND USER TERMINAL PERFORMING INTERFERENCE CANCELLATION

CROSS REFERENCE TO RELATED APPLICATION

This application is a Divisional Application of U.S. patent application Ser. No. 14/654,489 filed Jun. 19, 2015, which is a Continuation Application of International Application No. PCT/JP2013/080294, filed Nov. 8, 2013, which claims benefit of U.S. Provisional Application Nos. 61/740,989 filed Dec. 21, 2012, 61/745,016 filed Dec. 21, 2012, and 61/745,043 filed Dec. 21, 2012, the entire contents of which are incorporated herein by reference.

TECHNICAL FIELD

The present disclosure relates to a mobile communication system, a communication control method, a base station, and a user terminal that support CoMP.

BACKGROUND ART

In 3GPP (3rd Generation Partnership Project) that is a project aiming to standardize a mobile communication system, on and after release 11, the standardization of CoMP (Coordinated Multi-Point) is scheduled to be performed (see Non Patent Document 1). The CoMP represents a communication mode in which a transmission/reception point (a base station or a cell) in the same place is positioned as one "point" and a plurality of points communicate with a user terminal in cooperation with one another.

As a downlink CoMP scheme, JT (Joint Transmission), DPS (Dynamic Point Selection), CS (Coordinated Scheduling), and CB (Coordinated Beamforming) are proposed.

The JT-CoMP represents a scheme in which a plurality of points simultaneously perform transmission to a user terminal by using the same radio resource. The DPS-CoMP and the CS-CoMP represent a scheme in which a plurality of points ensure the same radio resource and selectively perform transmission to a user terminal The CB-CoMP represents a scheme in which a plurality of points perform beamforming and null steering of a transmission beam in cooperation with one another.

PRIOR ART DOCUMENTS

Non Patent Documents

Non Patent Document 1: 3GPP Technical Report "TR 36.819 V11.1.0" December, 2011

SUMMARY OF DISCLOSURE

However, each of the aforementioned CoMP schemes has the following problems.

The JT-CoMP, the DPS-CoMP, and the CS-CoMP have a problem that the use efficiency of a radio resource is reduced because each point consumes a radio resource for one user terminal The CB-CoMP has a problem that although it is possible to suppress the reduction of the use efficiency of a radio resource, the cost (a device cost and an installation cost) of each point is high because each point needs to have a plurality of antennas.

Therefore, the present disclosure provides a mobile communication system, a communication control method, a base station, and a processor that realize a new CoMP scheme capable of solving the aforementioned problems.

A first base station, which manages a serving cell of a user terminal comprises: a receiver configured to receive transmission characteristics information and transmission power information from a second base station which manages a neighboring cell of the serving cell, wherein the transmission characteristics information indicates transmission characteristics of a data signal transmitted by the second base station, the transmission power information indicates parameters for determining a ratio of transmission power of the data signal transmitted by the second base station to transmission power of a Cell-specific Reference Signal (CRS) transmitted by the second base station; a controller configured to generate interference cancelling information on the basis of the received transmission characteristics information and the received transmission power information, the interference cancelling information being for mitigating interference caused by the data signal and the CRS transmitted from the second base station received by the user terminal; and a transmitter configured to transmit the interference cancelling information to the user terminal by dedicated singling.

A first base station, which manages a serving cell of a user terminal comprises: a receiver configured to receive transmission characteristics information and transmission power information from a second base station that manages a neighboring cell of the serving cell, wherein the transmission characteristics information indicates transmission characteristics of a data signal transmitted by the second base station, the transmission power information indicates a relation between transmission power of the data signal transmitted by the second base station and transmission power of a Cell-specific Reference Signal (CRS) transmitted by the second base station; a controller configured to generate interference cancelling information on the basis of the received transmission characteristics information and the received transmission power information, the interference cancelling information being for mitigating interference caused by the data signal and the CRS transmitted from the second base station received by the user terminal; and a transmitter configured to transmit the interference cancelling information to the user terminal by dedicated singling.

A communication control method used in a first base station comprises: receiving transmission characteristics information and transmission power information from a second base station which manages a neighboring cell of the serving cell, wherein the transmission characteristics information indicates transmission characteristics of a data signal transmitted by the second base station, the transmission power information indicates parameters for determining a ratio of transmission power of the data signal transmitted by the second base station to transmission power of a Cell-specific Reference Signal (CRS) transmitted by the second base station; generating interference cancelling information on the basis of the received transmission characteristics information and the received transmission power information, the interference cancelling information being for mitigating interference caused by the data signal and the CRS transmitted from the second base station received by the user terminal; and transmitting the interference cancelling information to the user terminal by dedicated singling.

BRIEF DESCRIPTION OF DRAWINGS

FIG. 22 is a sequence diagram according to a fourth embodiment.

FIG. 23 is a diagram illustrating an operation according to a fifth embodiment.

FIG. 24 is an operation sequence diagram according to the fifth embodiment.

DESCRIPTION OF EMBODIMENTS

[Overview of Embodiments]

Figure 1:
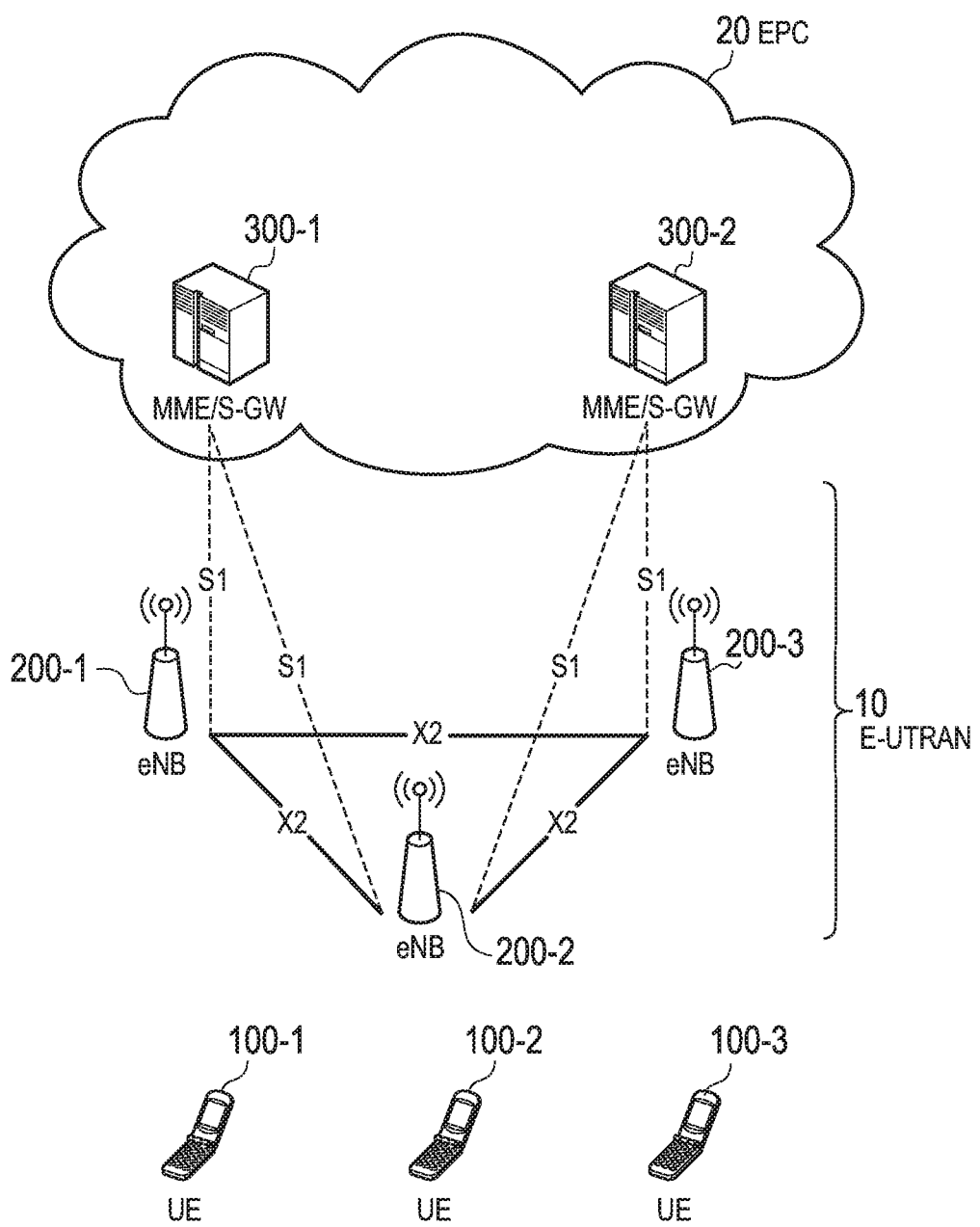
FIG. 1 is a configuration diagram of an LTE system according to a first embodiment and a second embodiment.

A mobile communication system according to first to third embodiments includes a user terminal that receives a desired wave signal from a serving cell while receiving an interference wave signal from a neighboring cell adjacent to the serving cell, and a base station that manages the serving cell. The base station includes a controller that generates an interference replica signal corresponding to the interference wave signal and superposes the interference replica signal on the desired wave signal, and a transmitter that transmits the desired wave signal superposed with the interference replica signal to the user terminal The controller generates the interference replica signal such that the interference replica signal cancels the interference wave signal in a location of the user terminal. The interference replica signal acts as a disturbing signal, which disturbs the demodulation of the desired wave signal, in a location other than the location of the user terminal According to such a scheme, it is possible to reduce received power of the interference wave signal in the user terminal, so that it is possible to improve a desired wave-to-interference wave ratio, that is, SIR (Signal-to-Interference Ratio). Furthermore, since it is not necessary to ensure a radio resource for the user terminal in the neighboring cell, it is possible to improve the use efficiency of a radio resource as compared with JT-CoMP, DPS-CoMP, and CS-CoMP. Moreover, when the base station does not have a plurality of antennas, that is, even when beamforming and null steering are not possible, the present scheme is applicable.

Furthermore, since the interference replica signal acts as the disturbing signal, which disturbs the demodulation of the desired wave signal, in locations other than the location of the user terminal, it is possible to enhance security in radio communication.

In the second embodiment, the neighboring cell is managed by different base station than the base station. The controller notifies the different base station of location information on the location of the user terminal. The different base station increases received power of the interference wave signal in the location of the user terminal on the basis of the location information. The controller increases transmission power of the interference replica signal in response to an increase in the received power of the interference wave signal.

In the third embodiment, on the basis of QoS required for communication of the user terminal, the controller determines whether to perform superposition transmission in which the interference replica signal is superposed on the desired wave signal.

In a modification of the third embodiment, on the basis of a security level required for communication of the user terminal, the controller determines whether to perform superposition transmission in which the interference replica signal is superposed on the desired wave signal.

A communication control method according to first to third embodiments is used in a mobile communication system including a base station that manages a serving cell and a user terminal that receives a desired wave signal from the serving cell while receiving an interference wave signal from a neighboring cell adjacent to the serving cell. The communication control method comprises: a step A of generating, by the base station, an interference replica signal corresponding to the interference wave signal; a step B of superposing, by the base station, the interference replica signal on the desired wave signal; and a step C of transmitting, by the base station, the desired wave signal superposed with the interference replica signal to the user terminal. In the step A, the interference replica signal is generated such that the interference replica signal cancels the interference wave signal in a location of the user terminal. The interference replica signal acts as a disturbing signal, which disturbs demodulation of the desired wave signal, in a location other than the location of the user terminal.

A base station according to first to third embodiments manages a serving cell in a mobile communication system including a user terminal that receives a desired wave signal from the serving cell while receiving an interference wave signal from a neighboring cell adjacent to the serving cell. The base station comprises: a controller that generates an interference replica signal corresponding to the interference wave signal and superposes the interference replica signal on the desired wave signal; and a transmitter that transmits the desired wave signal superposed with the interference replica signal to the user terminal The controller generates the interference replica signal such that the interference replica signal cancels the interference wave signal in a location of the user terminal. The interference replica signal acts as a disturbing signal, which disturbs demodulation of the desired wave signal, in a location other than the location of the user terminal.

A processor according to first to third embodiments is provided in a base station that manages a serving cell in a mobile communication system including a user terminal that receives a desired wave signal from the serving cell while receiving an interference wave signal from a neighboring cell adjacent to the serving cell. The processor performs: a process A of generating an interference replica signal corresponding to the interference wave signal; a process B of superposing the interference replica signal on the desired wave signal; and a process C of transmitting the desired wave signal superposed with the interference replica signal to the user terminal. In the process A, the interference replica signal is generated such that the interference replica signal cancels the interference wave signal in a location of the user terminal. The interference replica signal acts as a disturbing signal, which disturbs demodulation of the desired wave signal, in a location other than the location of the user terminal.

A base station according to fourth embodiment manages a serving cell in a mobile communication system including a user terminal that receives a desired wave signal and a reference signal from the serving cell while receiving an interference wave signal from a neighboring cell adjacent to the serving cell. The base station includes a controller that notifies the user terminal of power difference information on a transmission power difference between the desired wave signal and the reference signal. The controller notifies the user terminal of the power difference information when an interference replica signal corresponding to the interference wave signal is superposed on the desired wave signal such that the interference replica signal cancels the interference wave signal received in the user terminal.

A user terminal according to the fourth embodiment receives a desired wave signal and a reference signal from a serving cell while receiving an interference wave signal from a neighboring cell adjacent to the serving cell. The user terminal includes a controller that demodulates the desired wave signal on the basis of the reference signal. On the desired wave signal, an interference replica signal for canceling the interference wave signal is superposed. When power difference information on a transmission power difference between the desired wave signal and the reference signal was received from the serving cell, the controller controls the demodulation of the desired wave signal on the basis of the power difference information.

According to the base station and the user terminal, in the coordinated interference cancellation scheme, the interference replica signal is superposed on the desired wave signal, so that it is possible to easily demodulate the desired wave signal even when the transmission power of the desired wave signal is lower than that of the reference signal.

In the fourth embodiment, the power difference information is a value indicating the transmission power difference or a flag indicating that the transmission power difference exists.

A communication control method according to the fourth embodiment is used in a mobile communication system including a user terminal that receives a desired wave signal and a reference signal from a serving cell while receiving an interference wave signal from a neighboring cell adjacent to the serving cell. The communication control method comprises: a notification step of notifying, by a base station managing the serving cell, the user terminal of power difference information on a transmission power difference between the desired wave signal and the reference signal. In the notification step, the user terminal is notified, by the base station, of the power difference information when an interference replica signal corresponding to the interference wave signal is superposed on the desired wave signal such that the interference replica signal cancels the interference wave signal received in the user terminal.

A communication control method according to the fourth embodiment is used in a mobile communication system including a user terminal that receives a desired wave signal and a reference signal from a serving cell while receiving an interference wave signal from a neighboring cell adjacent to the serving cell. The reference signal is a signal that is used in demodulation of the desired wave signal. An interference replica signal for canceling the interference wave signal is superposed on the desired wave signal. The communication control method comprises a step of controlling, by the user terminal, the demodulation of the desired wave signal on the basis of power difference information on a transmission power difference between the desired wave signal and the reference signal when the power difference information is received from the serving cell.

A processor according to the fourth embodiment is provided in a base station that manages a serving cell in a mobile communication system including a user terminal that receives a desired wave signal and a reference signal from the serving cell while receiving an interference wave signal from a neighboring cell adjacent to the serving cell. The processor executes: a notification process of notifying the user terminal of power difference information on a transmission power difference between the desired wave signal and the reference signal. In the notification process, the user terminal is notified of the power difference information when an interference replica signal corresponding to the interference wave signal is superposed on the desired wave signal such that the interference replica signal cancels the interference wave signal received in the user terminal.

A processor according to the fourth embodiment is provided in a user terminal that receives a desired wave signal and a reference signal from a serving cell while receiving an interference wave signal from a neighboring cell adjacent to the serving cell. The reference signal is a signal that is used in demodulation of the desired wave signal. An interference replica signal for canceling the interference wave signal is superposed on the desired wave signal. The processor executes a process of controlling the demodulation of the desired wave signal on the basis of power difference information on a transmission power difference between the desired wave signal and the reference signal when the power difference information is received from the serving cell.

A mobile communication system according to a fifth embodiment includes a user terminal that receives a desired wave signal from a serving cell while receiving an interference wave signal from a neighboring cell adjacent to the serving cell, and a base station that manages the neighboring cell. The base station includes a controller that generates a desired wave replica signal corresponding to the desired wave signal and superposes the desired wave replica signal on the interference wave signal, and a transmitter that transmits the interference wave signal superposed with the desired wave replica signal. The controller generates the desired wave replica signal such that the desired wave replica signal received in the user terminal is synthesized with the desired wave signal received in the user terminal.

According to such a scheme, it is possible to increase the received power of the desired wave signal in the user terminal, so that it is possible to improve a desired wave-to-interference wave ratio, that is, SIR (Signal-to-Interference Ratio). Furthermore, since it is not necessary to ensure a radio resource for the user terminal in the neighboring cell, it is possible to improve the use efficiency of a radio resource as compared with JT-CoMP, DPS-CoMP, and CS-CoMP. Moreover, when the base station does not have a plurality of antennas, that is, even when beamforming and null steering are not possible, the present scheme is applicable.

In the fifth embodiment, the controller sets transmission power of the desired wave replica signal to be lower than transmission power of the interference wave signal.

In the fifth embodiment, the serving cell is managed by different base station than the base station.

In the fifth embodiment, the different base station generates an interference replica signal corresponding to the interference wave signal, and superposes the interference replica signal on the desired wave signal, and transmits the desired wave signal. The different base station generates the interference replica signal such that the interference replica signal received in the user terminal cancels the interference wave signal received in the user terminal.

A communication control method according to the fifth embodiment is used in a mobile communication system including a user terminal that receives a desired wave signal from a serving cell while receiving an interference wave signal from a neighboring cell adjacent to the serving cell and a base station that manages the neighboring cell. The communication control method comprise: a step A of generating, by the base station, a desired wave replica signal corresponding to the desired wave signal; a step B of superposing, by the base station, the desired wave replica signal on the interference wave signal; and a step C of transmitting, by the base station, the interference wave signal superposed with the desired wave replica signal. In the step A, the desired wave replica signal is generated such that the desired wave replica signal received in the user terminal is synthesized with the desired wave signal received in the user terminal.

A base station according to the fifth embodiment manages a neighboring cell in a mobile communication system including a user terminal that receives a desired wave signal from a serving cell while receiving an interference wave signal from the neighboring cell adjacent to the serving cell. The base station comprises: a controller that generates a desired wave replica signal corresponding to the desired wave signal and superposes the desired wave replica signal on the interference wave signal; and a transmitter that transmits the interference wave signal superposed with the desired wave replica signal. The controller generates the desired wave replica signal such that the desired wave replica signal received in the user terminal is synthesized with the desired wave signal received in the user terminal.

A processor according to the fifth embodiment is provided in a base station that manages a neighboring cell in a mobile communication system including a user terminal that receives a desired wave signal from a serving cell while receiving an interference wave signal from the neighboring cell adjacent to the serving cell. The processor executes: a process A of generating a desired wave replica signal corresponding to the desired wave signal; a process B of superposing the desired wave replica signal on the interference wave signal; and a process C of transmitting the interference wave signal superposed with the desired wave replica signal. In the process A, the desired wave replica signal is generated such that the desired wave replica signal received in the user terminal is synthesized with the desired wave signal received in the user terminal.

[First Embodiment]

Hereinafter, with reference to the accompanying drawings, a description will be provided for an embodiment when the present disclosure is applied to a mobile communication system (an LTE system) configured in accordance with 3GPP standards.

(LTE System)

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 with which a connection with the cell of the eNB 200 is established.

It is noted that the "cell" is used as a term indicating a minimum unit of a radio communication area, and is also used as a term indicating a function of performing radio communication with the UE 100.

The eNB 200 has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls for the UE 100 and corresponds to a control center. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
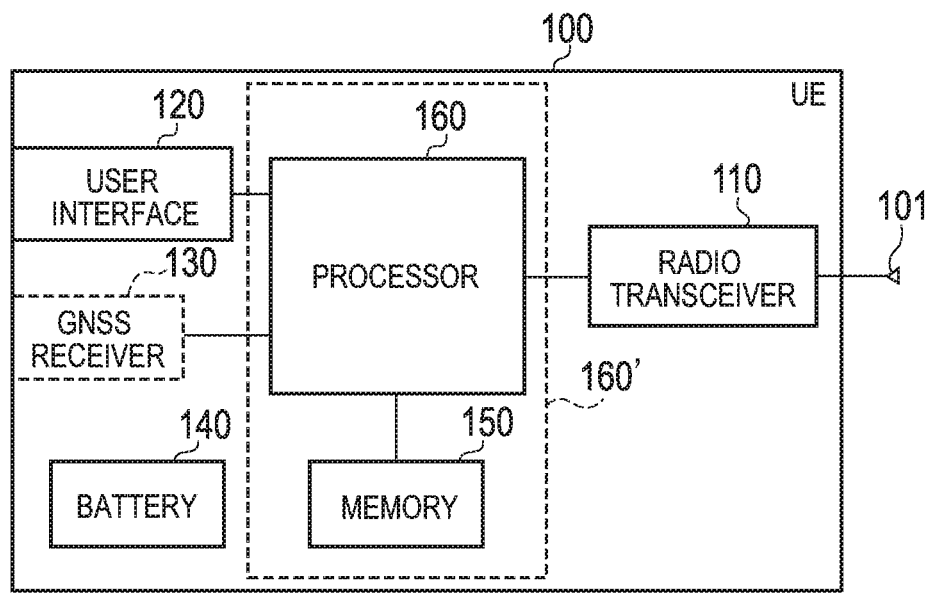
FIG. 2 is a block diagram of UE according to the first embodiment and the second embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive radio signals. A plurality of antennas 101 may be provided. The radio transceiver 110 converts a baseband signal output from the processor 160 into the radio signals, and transmits the radio signals from the antenna 101. Furthermore, the radio transceiver 110 converts the radio signals received by the antenna 101 into the baseband signals, and outputs the baseband signals to the processor 160.

The user interface 120 is an interface with a user carrying the UE 100, and for example, includes a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of baseband signals, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
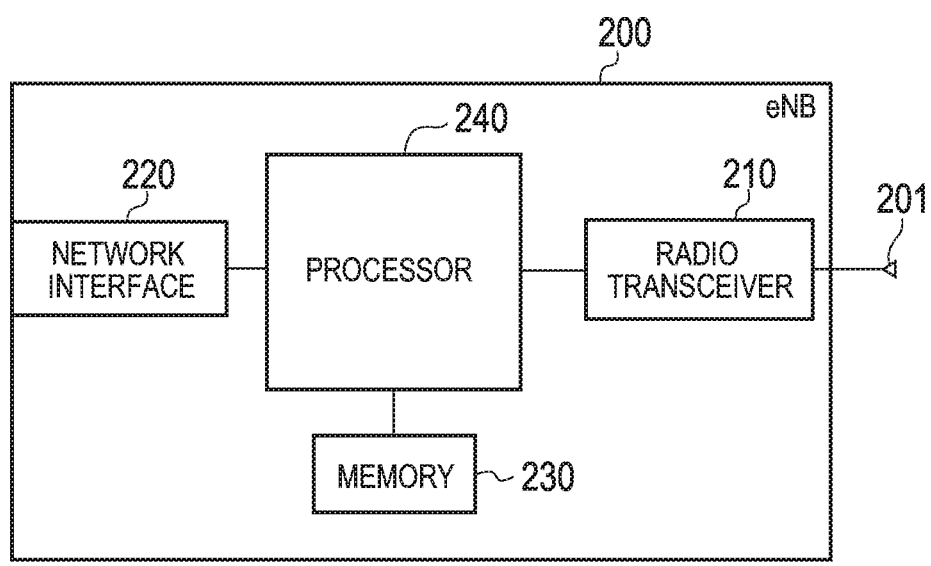
FIG. 3 is a block diagram of eNB according to the first embodiment and the second embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive radio signals. A plurality of antennas 201 may be provided. The radio transceiver 210 converts the baseband signals output from the processor 240 into the radio signals, and transmits the radio signals from the antenna 201. Furthermore, the radio transceiver 210 converts the radio signals received by the antenna 201 into the baseband signals, and outputs the baseband signals to the processor 240.

The network interface 220 is connected to the neighboring eNB 200 via the X2 interface and is connected to the MME/S-GW 300 via the S1 interface. The network interface 220 is used in communication performed on the X2 interface and communication performed on the Si interface.

The memory 230 stores a program to be executed by the processor 240 and information to be used for a process by the processor 240.

The processor 240 includes a baseband processor that performs modulation and demodulation, encoding and decoding and the like of a baseband signal, and a CPU that performs various processes by executing the program stored in the memory 230. The processor 240 implements various processes and various communication protocols described later.

Figure 4:
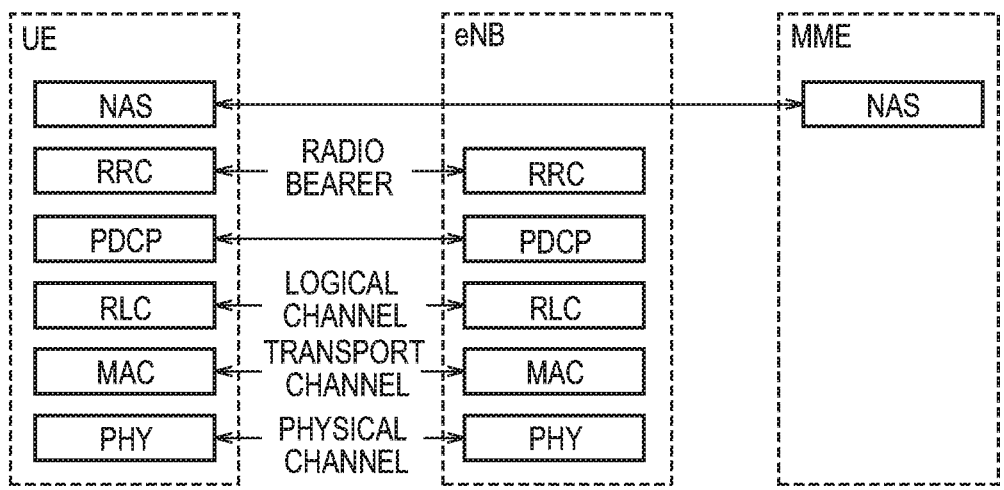
FIG. 4 is a protocol stack diagram of a radio interface in an LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, resource mapping and demapping, and the like. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) of an uplink and a downlink, and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
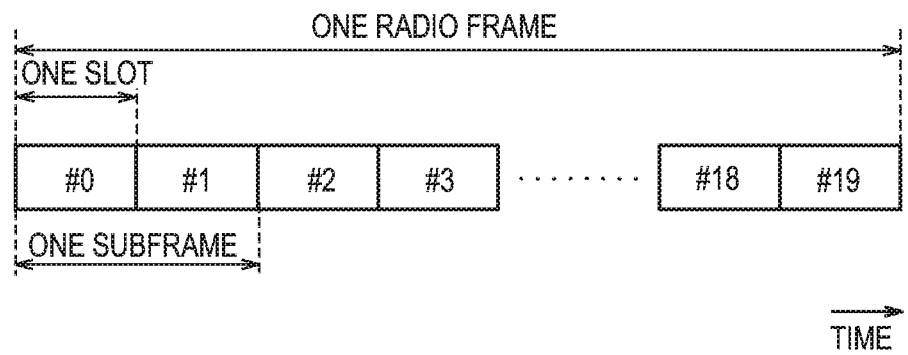
FIG. 5 is a configuration diagram of a radio frame used in the LTE system.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A minimum resource unit configured by one subcarrier and one symbol is called a resource element (RE).

Furthermore, among radio resources assigned to the UE 100, a frequency resource can be designated by a resource block and a time resource can be designated by a subframe (or a slot).

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH). Moreover, in each subframe, a sounding reference signal (SRS) is arranged.

Figure 6:
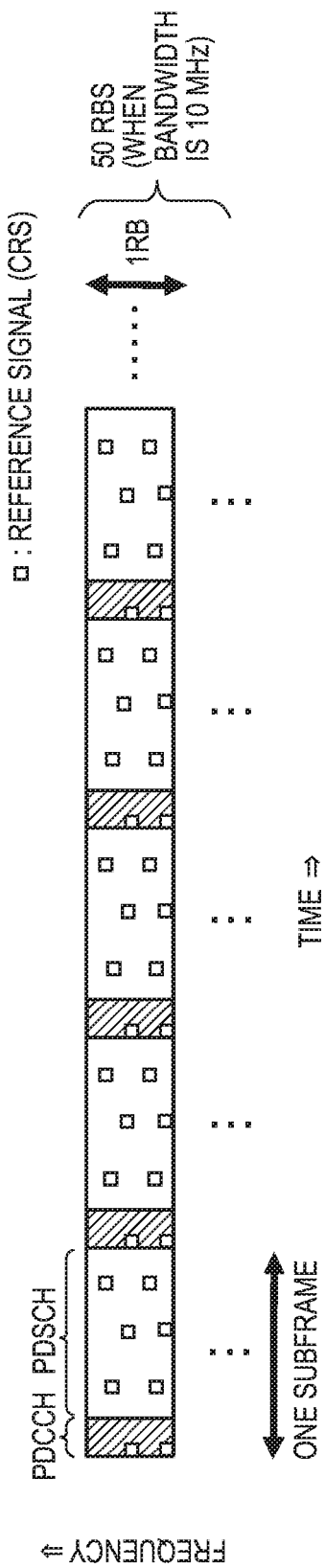
FIG. 6 is a configuration diagram of a radio frame used in a downlink.

FIG. 6 is a configuration diagram of a radio frame used in a downlink.

As illustrated in FIG. 6, in the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH).

In a downlink, a cell-specific reference signal (CRS) and/or a downlink reference signal such as a channel-state-information reference signal (CSI-RS) are dispersed and arranged in each subframe. The downlink reference signal is configured by a predetermined orthogonal signal sequence, and arranged in a predetermined resource element.

(Overview of Coordinated Interference Cancellation Scheme)

Figure 7:
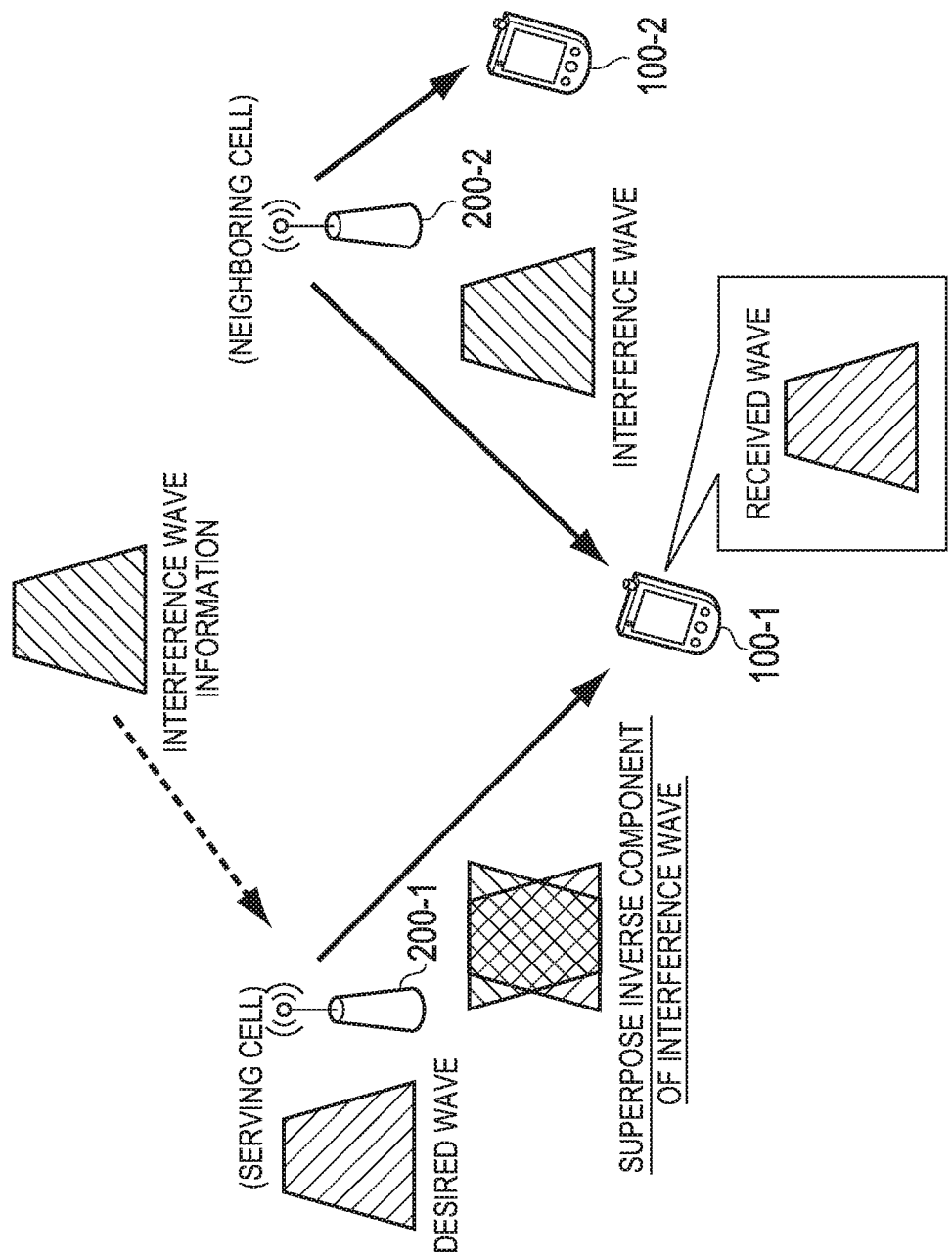
FIG. 7 is a diagram illustrating the overview of a coordinated interference cancellation scheme according to the first embodiment and the second embodiment.

FIG. 7 is a diagram for explaining the overview of the coordinated interference cancellation scheme according to the present embodiment.

As illustrated in FIG. 7, UE 100-1 is UE to which the coordinated interference cancellation scheme is applied. The UE 100-1 establishes a connection (an RRC connection) with a cell managed by eNB 200-1. That is, the cell managed by the eNB 200-1 corresponds to a serving cell of the UE 100-1.

In the present embodiment, a neighboring cell adjacent to the serving cell is managed by eNB 200-2 different from the eNB 200-1. In the example of FIG. 7, UE 100-2 establishes a connection (an RRC connection) with a cell managed by the eNB 200-2. In addition, the eNB 200-1 and the eNB 200-2 synchronize with each other.

The eNB 200-1 and the eNB 200-2 are connected mutually via an X2 interface. Furthermore, the eNB 200-1 and the eNB 200-2 are connected to the MME/S-GW 300 via the S1 interface.

The UE 100-1 is located around the boundary between the cell (the serving cell) managed by the eNB 200-1 and the cell (the neighboring cell) managed by the eNB 200-2. Thus, when the eNB 200-2 performs transmission to the UE 100-2 by using a radio resource equal to that used in the eNB 200-1, the UE 100-1 receives downlink interference from the eNB 200-2. That is, the UE 100-1 receives a desired wave signal from the serving cell while receiving an interference wave signal from the neighboring cell.

In such an operation environment, the eNB 200-1 generates an interference replica signal corresponding to the interference wave signal and superposes the interference replica signal on the desired wave signal. Then, the eNB 200-1 transmits the desired wave signal superposed with the interference replica signal to the UE 100-1.

Furthermore, the eNB 200-1 generates the interference replica signal such that the interference replica signal received in the UE 100-1 cancels the interference wave signal received in the UE 100-1. Specifically, the eNB 200-1 generates the interference replica signal such that a phase of the interference replica signal received in the UE 100-1 is inverse to a phase of the interference wave signal received in the UE 100-1. Furthermore, the eNB 200-1 generates the interference replica signal such that an amplitude of the interference replica signal received in the UE 100-1 is equal to an amplitude of the interference wave signal received in the UE 100-1.

In this way, the interference replica signal is synthesized with the interference wave signal in an inverse phase in the location of the UE 100-1, and cancels the interference wave signal. Accordingly, it is possible to reduce received power of the interference wave signal in the UE 100-1, resulting in the improvement of SIR. Furthermore, since it is not necessary to ensure a radio resource for the UE 100-1 in the neighboring cell, it is possible to improve the use efficiency of a radio resource as compared with JT-CoMP, DPS-CoMP, and CS-CoMP. Moreover, when the eNB 200-2 does not have a plurality of antennas, that is, even when beamforming and null steering are not possible, the present scheme (the coordinated interference cancellation scheme) is applicable.

Furthermore, the interference replica signal remains without being synthesized with the interference wave signal in an inverse phase in a location other than the location of the UE 100-1. Accordingly, the interference replica signal also acts as a disturbing signal, which disturbs the demodulation of the desired wave signal, in the location other than the location of the UE 100-1. Consequently, according to the coordinated interference cancellation scheme, it is also possible to enhance the confidentiality of communication.

The eNB 200-1 acquires at least a part of information, which is necessary for generating the interference replica signal, from at least one of the eNB 200-2, the MME/S-GW 300, and the UE 100-1.

In order to generate the interference replica signal, firstly, information (interference wave information) on a signal waveform of the interference wave signal transmitted by the eNB 200-2 is necessary.

However, the interference wave signal transmitted by the eNB 200-2 receives the influence of a channel characteristic between the eNB 200-2 and the UE 100-1, and is received in the UE 100-1. Accordingly, in order to generate the interference replica signal, secondly, information (channel information) on the channel characteristic between the eNB 200-2 and the UE 100-1 is necessary.

Moreover, in order to improve the accuracy of the interference replica signal, information other than interference wave information and the channel information is also available. Details of such information will be described later.

(Configuration of eNB 200-1)

Figure 8:
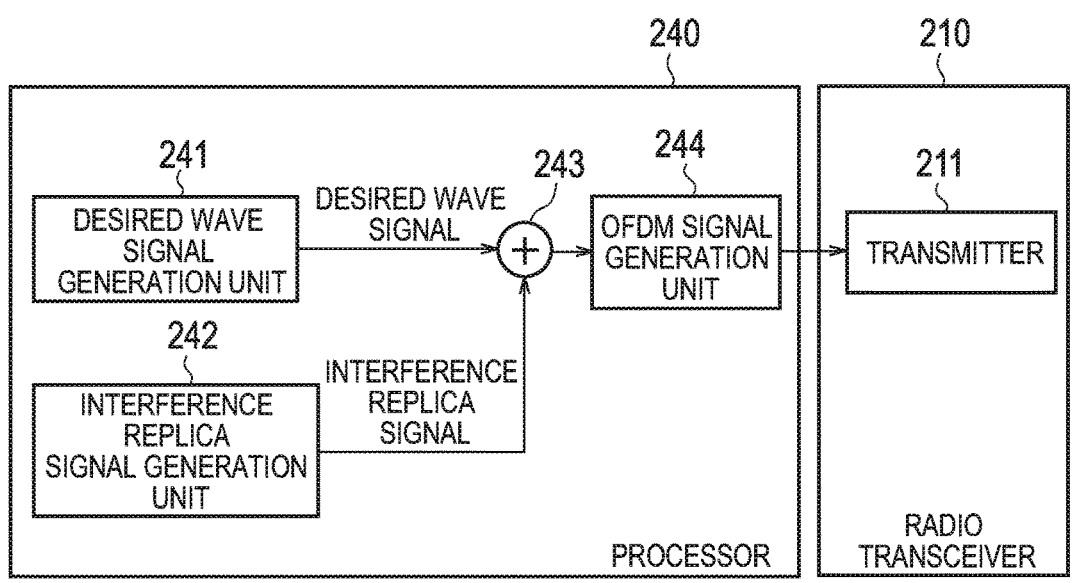
FIG. 8 is a block diagram of eNB for realizing the coordinated interference cancellation scheme according to the first embodiment and the second embodiment.

FIG. 8 is a block diagram of the eNB 200-1 for realizing the coordinated interference cancellation scheme.

As illustrated in FIG. 8, the processor 240 includes a desired wave signal generation unit 241 that generates the desired wave signal, an interference replica signal generation unit 242 that generates the interference replica signal, a superposition unit 243 that superposes the interference replica signal on the desired wave signal, and an OFDM signal generation unit 244 that generates an OFDM signal (a superposed signal) from the desired wave signal superposed with the interference replica signal. The radio transceiver 210 includes a transmitter 211 that amplifies and transmits the OFDM signal (the superposed signal).

The desired wave signal generation unit 241 performs transmission processing on transmission data (user data) to the UE 100-1, thereby converting the transmission data to the UE 100-1 into the desired wave signal. The transmission processing includes a coding process, a modulation process, a precoding process, and a resource mapping process.

The coding process is a process for coding the transmission data. The coding process may include a process for adding an error detecting code (a CRC code) to the transmission data, a scrambling process and the like.

The modulation process is a process for modulating the coded transmission data (the coded data).

The precoding process is a process for precoding the coded data (a desired wave signal waveform) modulated on the basis of channel information indicating a channel characteristic between the eNB 200-1 and the UE 100-1.

In addition, hereinafter, the channel information indicating the channel characteristic between the eNB 200-1 and the UE 100-1 is called "channel information 1" and the channel information indicating the channel characteristic between the eNB 200-2 and the UE 100-1 is called "channel information 2".

The resource mapping process is a process for mapping the precoded desired wave signal waveform to a physical resource.

As a result of these processes, the desired wave signal generation unit 241 outputs the desired wave signal to the superposition unit 243.

On the basis of at least the channel information 2, the interference replica signal generation unit 242 adjusts the phase and the amplitude of an interference wave signal waveform corresponding to the interference wave information to generate the interference replica signal. Furthermore, the interference replica signal generation unit 242 also adds information for improving the accuracy of the interference replica signal, and generates the interference replica signal. Moreover, the interference replica signal generation unit 242 may also adjust transmission power in the radio transceiver 210.

Specifically, the interference replica signal generation unit 242 generates the interference replica signal such that the phase of the interference replica signal received in the UE 100-1 is inverse to the phase of the interference wave signal received in the UE 100-1. Furthermore, the eNB 200-1 generates the interference replica signal such that an amplitude of the interference replica signal received in the UE 100-1 is equal to an amplitude of the interference wave signal received in the UE 100-1.

For example, the interference replica signal generation unit 242 estimates the interference wave received waveform received in the UE 100-1 by using the desired wave information and the channel information 2. Next, the interference replica signal generation unit 242 maps (vectorizes) the interference wave received waveform on a phase plane, and rotates a phase by 180 degrees while keeping an amplitude constant, thereby generating an interference replica signal (a replica vector). However, in consideration of the difference of a CRS location or the presence or absence of DMRS (a reference signal for demodulation), it is necessary to generate a replica to correspond to a resource element position. Furthermore, it is not possible to superpose the replica on the CRS location of the serving cell.

Firstly, a method of acquiring the interference wave information will be described. The interference wave information, for example, indicates an interference wave signal waveform. The interference wave signal waveform indicates a waveform of a signal after modulation in the eNB 200-2. Alternatively, when it is possible to acquire a waveform (an inverse interference signal waveform) of a signal having a phase inverse to that and an amplitude equal to that of the interference wave signal waveform, the interference wave information may indicate an inverse interference signal.

When the interference wave information indicates the interference wave signal waveform or the inverse interference signal waveform, the network interface 220 of the eNB 200-1 receives the interference wave signal waveform or the inverse interference signal waveform from the eNB 200-1. Then, the interference replica signal generation unit 242 acquires the interference wave signal waveform or the inverse interference signal waveform received in the network interface 220.

Alternatively, the interference wave information indicates transmission data (user data to the UE 100-2) before being converted into an interference wave signal in the eNB 200-2. The transmission data may be transmission data before being coded or transmission data after being coded.

In addition, hereinafter, transmission data for the UE 100-1 is called "transmission data 1" and transmission data for the UE 100-2 is called "transmission data 2".

When the interference wave information indicates the transmission data 2, the network interface 220 of the eNB 200-1 receives the transmission data 2 from the eNB 200-1 or the MME/S-GW 300. The interference replica signal generation unit 242 acquires the transmission data 2 received in the network interface 220.

Furthermore, when the interference wave information indicates the transmission data 2, the interference replica signal generation unit 242 needs to perform the same transmission processing as the transmission processing that is performed for the transmission data 2 by the eNB 200-2, and to generate the interference wave signal waveform. Accordingly, the network interface 220 of the eNB 200-1 receives, from the eNB 200-2, transmission processing information indicating the content of the transmission processing that is performed for the transmission data 2 by the eNB 200-2. The content of the transmission processing, for example, indicates the content of the coding process, the content of the modulation process, and the content of the resource mapping process. The interference replica signal generation unit 242 acquires the transmission processing information received in the network interface 220.

Secondly, a method of acquiring the channel information 2 will be described. Since the channel information 2 is information indicating a downlink channel characteristic, the channel information 2 is generated in the UE 100-1 in the case of FDD. On the other hand, in the case of TDD, the channel information 2 is generated in the UE 100-1 or the eNB 200-2.

In addition, when the interference wave information indicates the inverse interference signal waveform, it is noted that the interference replica signal generation unit 242 does not need to acquire the channel information 2.

When the channel information 2 is generated in the UE 100-1, the channel information 2 may be directly transmitted from the UE 100-1 to the eNB 200-1 or indirectly transmitted from the UE 100-1 to the eNB 200-1 via the eNB 200-2. The network interface 220 of the eNB 200-1 receives the channel information 2 from the eNB 200-2. Alternatively, the radio transceiver 210 of the eNB 200-1 receives the channel information 2 from the UE 100-1. The interference replica signal generation unit 242 acquires the channel information 2 received in the network interface 220 or the radio transceiver 210.

Thirdly, a method of acquiring information for improving the accuracy of the interference replica signal will be described.

The information for improving the accuracy of the interference replica signal is received power information indicating received power (RSRP; Reference Signal Received Power) for a reference signal received in the UE 100-1 from the eNB 200-2. The interference replica signal generation unit 242 adds the received power information, thereby making it possible to appropriately adjust the amplitude (including transmission power) of the interference replica signal.

The received power information is generated in the UE 100-1. The received power information may be directly transmitted from the UE 100-1 to the eNB 200-1 or indirectly transmitted from the UE 100-1 to the eNB 200-1 via the eNB 200-2.

The network interface 220 of the eNB 200-1 receives the received power information from the eNB 200-2. Alternatively, the radio transceiver 210 of the eNB 200-1 receives the received power information from the UE 100-1. The interference replica signal generation unit 242 acquires the received power information received in the network interface 220 or the radio transceiver 210.

Alternatively, the information for improving the accuracy of the interference replica signal is difference information indicating at least one of an amplitude difference and a phase difference between the reference signal (CRS) and the data signal that are transmitted by the eNB 200-2. The data signal is a signal that is transmitted by the eNB 200-2 on the physical downlink shared channel (PDSCH). The interference replica signal generation unit 242 adds the difference information, thereby making it possible to appropriately adjust the amplitude and/or the phase of the interference replica signal.

The difference information is generated in the eNB 200-2. The eNB 200-2 transmits the difference information to the eNB 200-1. The network interface 220 of the eNB 200-1 receives the difference information from the eNB 200-2. The interference replica signal generation unit 242 acquires the difference information received in the network interface 220.

Alternatively, the information for improving the accuracy of the interference replica signal is power difference information indicating a power difference between a reference signal (CRS) and the data signal that are transmitted by the eNB 200-2. The interference replica signal generation unit 242 adds the power difference information, thereby making it possible to appropriately adjust the amplitude (including transmission power) of the interference replica signal.

The power difference information, for example, is power difference information (information indicating a transmission power difference) generated in the eNB 200-2. The power difference information may be directly transmitted from the eNB 200-2 to the eNB 200-1 or indirectly transmitted from the eNB 200-2 to the eNB 200-1 via the UE 100-1.

The network interface 220 of the eNB 200-1 receives the power difference information from the eNB 200-2. Alternatively, the radio transceiver 210 of the eNB 200-1 receives the power difference information from the UE 100-1. The interference replica signal generation unit 242 acquires the power difference information received in the network interface 220 or the radio transceiver 210.

Alternatively, the information for improving the accuracy of the interference replica signal is time difference information indicating a delay time difference between a delay time from the eNB 200-1 to the UE 100-1 and a delay time from the eNB 200-2 to the UE 100-1. The interference replica signal generation unit 242 adds the time difference information, thereby making it possible to appropriately adjust the transmission timing of the interference replica signal.

The time difference information is generated in the UE 100-1. The time difference information may be directly transmitted from the UE 100-1 to the eNB 200-1 or indirectly transmitted from the UE 100-1 to the eNB 200-1 via the eNB 200-2.

The network interface 220 of the eNB 200-1 receives the time difference information from the eNB 200-2. Alternatively, the radio transceiver 210 of the eNB 200-1 receives the time difference information from the UE 100-1. The interference replica signal generation unit 242 acquires the time difference information received in the network interface 220 or the radio transceiver 210.

(Operation According to First Embodiment)

Hereinafter, an operation according to the present embodiment will be described in sequence of an operation pattern 1 to an operation pattern 8.

(1) Operation Pattern 1

Figure 9:
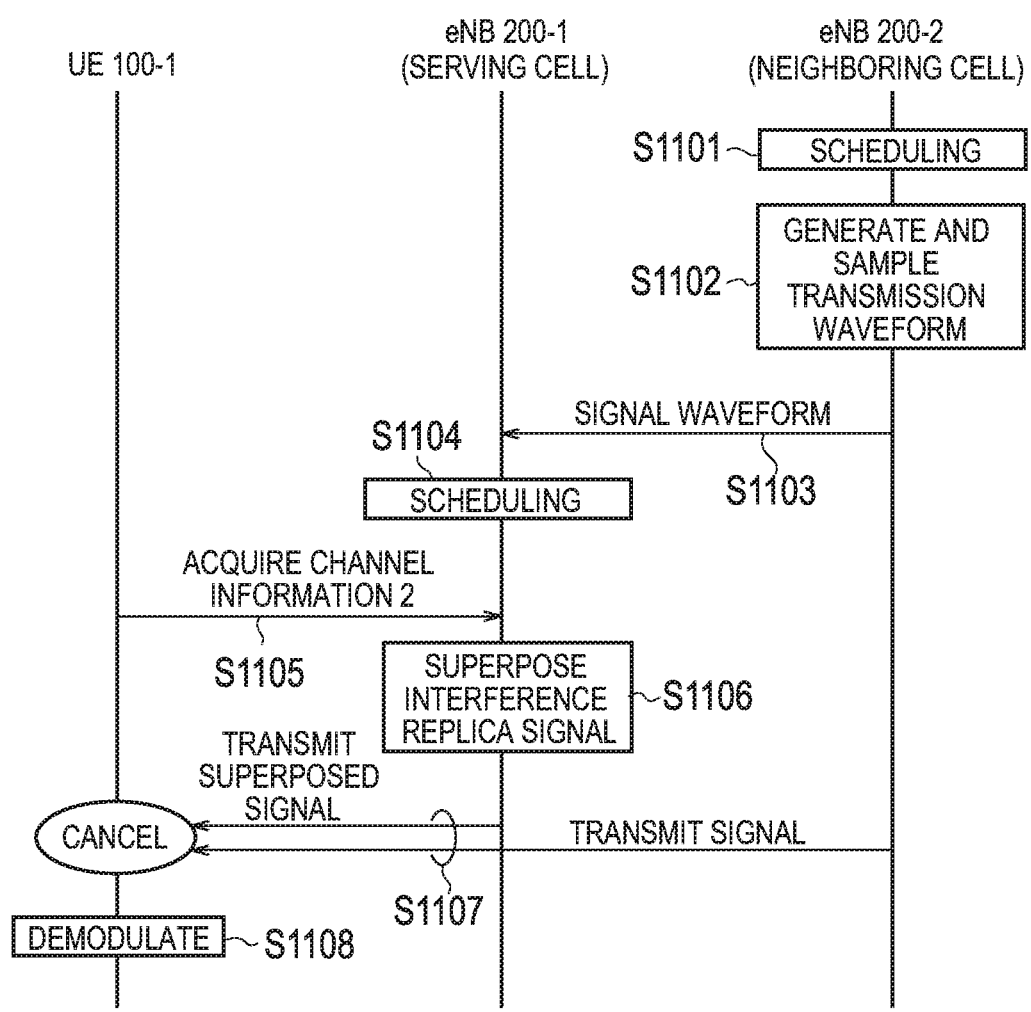
FIG. 9 is a sequence diagram of an operation information 1 according to the first embodiment.

FIG. 9 is a sequence diagram of an operation pattern 1 according to the present embodiment. In the operation pattern 1, interference wave information acquired by the eNB 200-1 indicates an interference signal waveform.

As illustrated in FIG. 9, in step S1101, the eNB 200-2 performs scheduling (or pre-scheduling) for the UE 100-2 that is connected to the cell of the eNB 200-2.

In step S1102, on the basis of a result of the scheduling, the eNB 200-2 generates a transmission signal waveform from transmission data 2 and samples the transmission signal waveform.

In step S1103, the eNB 200-2 transmits the sampled transmission signal waveform to the eNB 200-1. Furthermore, the sampled transmission signal waveform corresponds to an interference signal waveform.

In step S1104, the eNB 200-1 performs scheduling for the UE 100-1 that is connected to the cell of the eNB 200-1, and generates a transmission signal waveform (a desired wave signal waveform).

In step S1105, the eNB 200-1 acquires channel information 2. A detailed example of an operation, in which the eNB 200-1 acquires the channel information 2, will be described later.

In step S1106, on the basis of the channel information 2, the eNB 200-1 generates an inverse signal of an interference signal waveform as an interference replica signal. Then, the eNB 200-1 superposes the interference replica signal on a desired wave signal.

In step S1107, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1108, the UE 100-1 demodulates the desired wave signal included in the superposed signal.

In addition, in the present operation pattern, it is mainly assumed that the interference wave signal is canceled at a UE receiving end (the state of a radio signal). However, at the time of demodulation (the state of a baseband signal), the interference wave signal may be canceled. This is the same in the following operation patterns.

Figure 10:
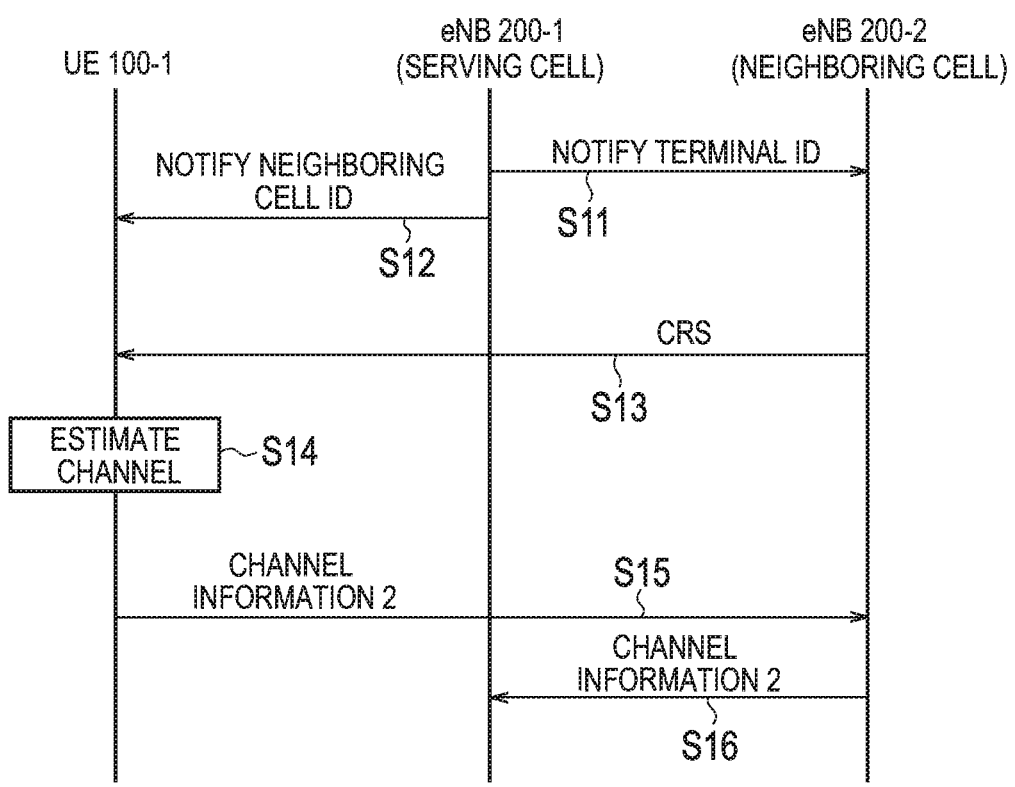
FIG. 10 is a sequence diagram of an operation example 1 in which channel information 2 is acquired according to the first embodiment.

FIG. 10 is a sequence diagram of an operation example 1 in which the eNB 200-1 acquires the channel information 2. In the present operation example, the channel information 2 is generated in the UE 100-1 and is transmitted from the UE 100-1 to the eNB 200-1 via the eNB 200-2.

As illustrated in FIG. 10, in step S11, the eNB 200-1 transmits, to the eNB 200-2, an identifier (a terminal ID) of the UE 100-1 to which the coordinated interference cancellation scheme is applied.

In step S12, the eNB 200-1 transmits, to the UE 100-1, an identifier (a cell ID) of a neighboring cell from which the UE 100-1 should acquire the channel information 2. The cell ID corresponds to cell designation information indicating a cell for which a channel characteristic should be estimated.

In step S13, the eNB 200-2 transmits a reference signal (CRS).

In step S14, on the basis of the cell ID received from the eNB 200-1, the UE 100-1 receives the reference signal (CRS) from the eNB 200-2. Then, the UE 100-1 performs channel estimation on the basis of the CRS and generates the channel information 2. As described above, the UE 100-1 estimates channel characteristic for the cell indicated by the cell ID received from the eNB 200-1, thereby generating the channel information 2.

In step S15, on the basis of the cell ID received from the eNB 200-1, the UE 100-1 transmits the channel information 2 to the eNB 200-2. Furthermore, the UE 100-1 adds the terminal ID of the UE 100-1 to the channel information 2, and transmits the channel information 2.

In step S16, on the basis of the terminal ID received from the eNB 200-1, the eNB 200-2 transfers the channel information 2, which was received from the UE 100-1, to the eNB 200-1. The eNB 200-1 receives the channel information 2 from the eNB 200-2.

Figure 11:
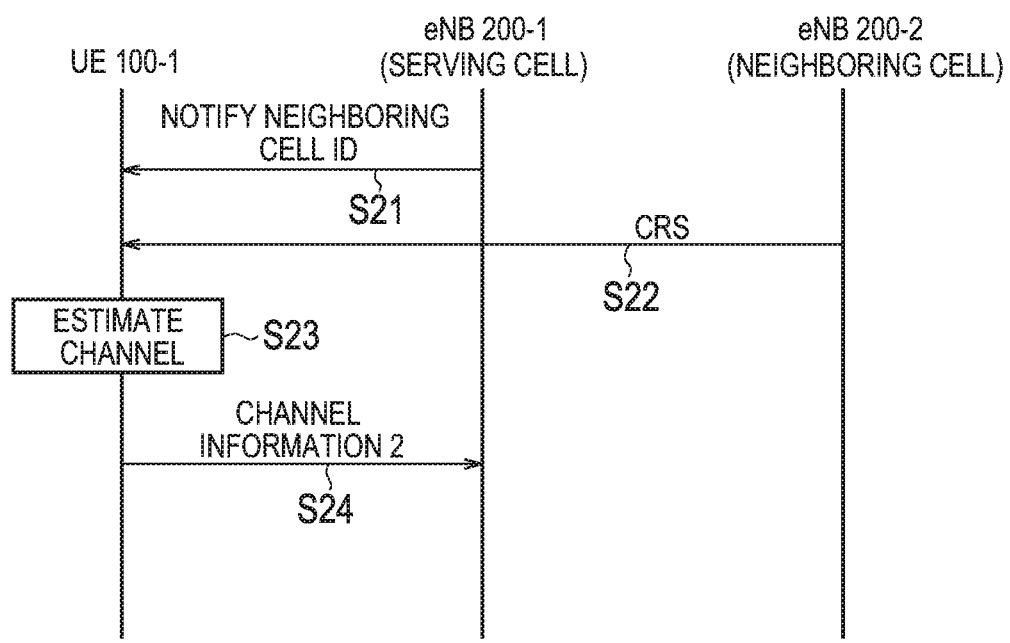
FIG. 11 is a sequence diagram of an operation example 2 in which channel information 2 is acquired according to the first embodiment.

FIG. 11 is a sequence diagram of an operation example 2 in which the eNB 200-1 acquires the channel information 2. In the present operation example, the channel information 2 is generated in the UE 100-1 and is directly transmitted from the UE 100-1 to the eNB 200-1.

As illustrated in FIG. 11, in step S21, the eNB 200-1 transmits, to the UE 100-1, an identifier (a cell ID) of a neighboring cell from which the UE 100-1 should acquire the channel information 2. The cell ID corresponds to cell designation information indicating a cell for which a channel characteristic should be estimated.

In step S22, the eNB 200-2 transmits a reference signal (CRS).

In step S23, on the basis of the cell ID received from the eNB 200-1, the UE 100-1 receives the reference signal (CRS) from the eNB 200-2. Then, the UE 100-1 performs channel estimation on the basis of the CRS and generates the channel information 2. As described above, the UE 100-1 estimates channel characteristic for the cell indicated by the cell ID received from the eNB 200-1, thereby generating the channel information 2.

In step S24, on the basis of the cell ID received from the eNB 200-1, the UE 100-1 transmits the channel information 2 to the eNB 200-1. The eNB 200-1 receives the channel information 2 from the UE 100-1.

Figure 12:
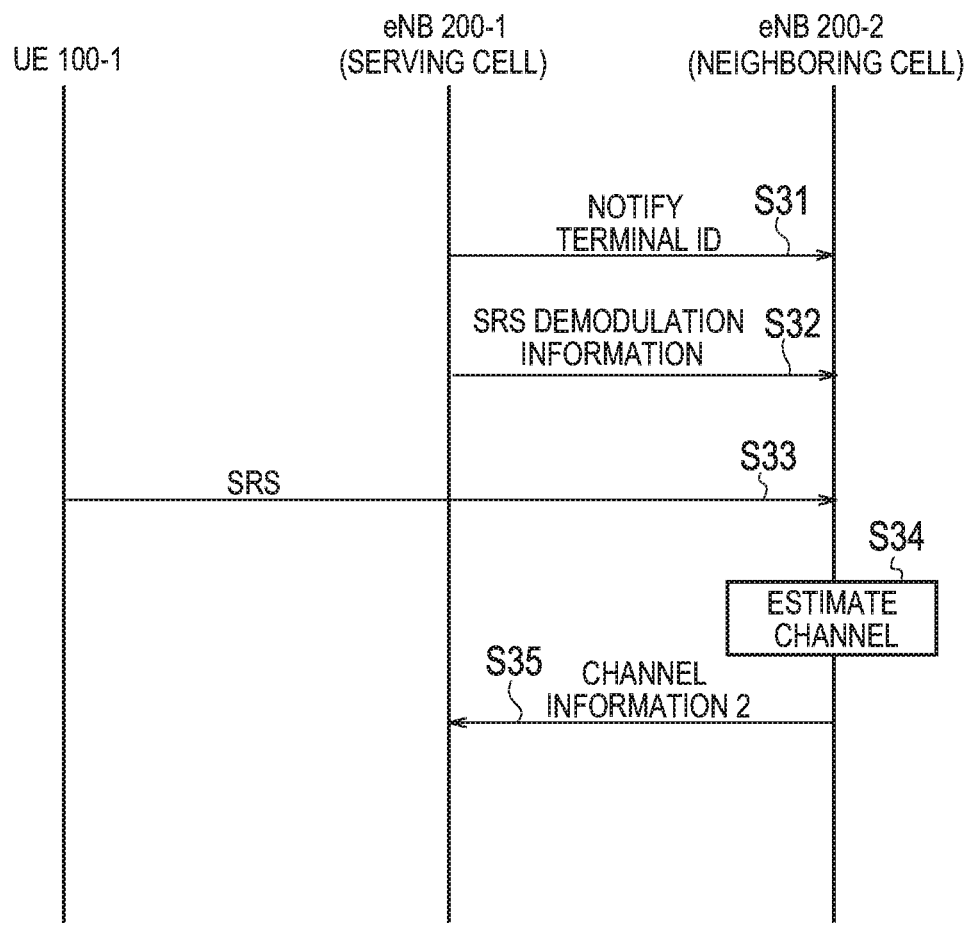
FIG. 12 is a sequence diagram of an operation example 3 in which channel information 2 is acquired according to the first embodiment.

FIG. 12 is a sequence diagram of an operation example 3 in which the eNB 200-1 acquires the channel information 2. In the present operation example, the channel information 2 is generated in the eNB 200-2 and is transmitted from the eNB 200-2 to the eNB 200-1.

As illustrated in FIG. 12, in step S31, the eNB 200-1 transmits, to the eNB 200-2, an identifier (a terminal ID) of the UE 100-1 to which the coordinated interference cancellation scheme is applied. The terminal ID corresponds to terminal designation information indicating UE for which a channel characteristic should be estimated.

In step S32, the eNB 200-1 transmits, to the eNB 200-2, SRS demodulation information for demodulating a reference signal (SRS) that is transmitted by the UE 100-1. The SRS demodulation information includes an SRS insertion subframe interval, an orthogonal code of a target UE, an SRS bandwidth, an SRS frequency domain position, an SRS hopping band and the like. The SRS demodulation information may further include a subframe start position and a system bandwidth. In addition, the eNB 200-1 may control the above-described terminal ID to be included into the SRS demodulation information, and transmit the SRS demodulation information to the eNB 200-2. In this case, step S31 may be omitted.

In step S33, the UE 100-1 transmits a reference signal (SRS).

In step S34, on the basis of the SRS demodulation information received from the eNB 200-1, the eNB 200-2 receives and demodulates the reference signal (SRS) from the UE 100-1. Then, the eNB 200-2 performs channel estimation on the basis of the SRS and generates the channel information 2.

In step S35, the eNB 200-2 transmits the channel information 2 to the eNB 200-1. The eNB 200-1 receives the channel information 2 from the eNB 200-2.

(2) Operation Pattern 2

Figure 13:
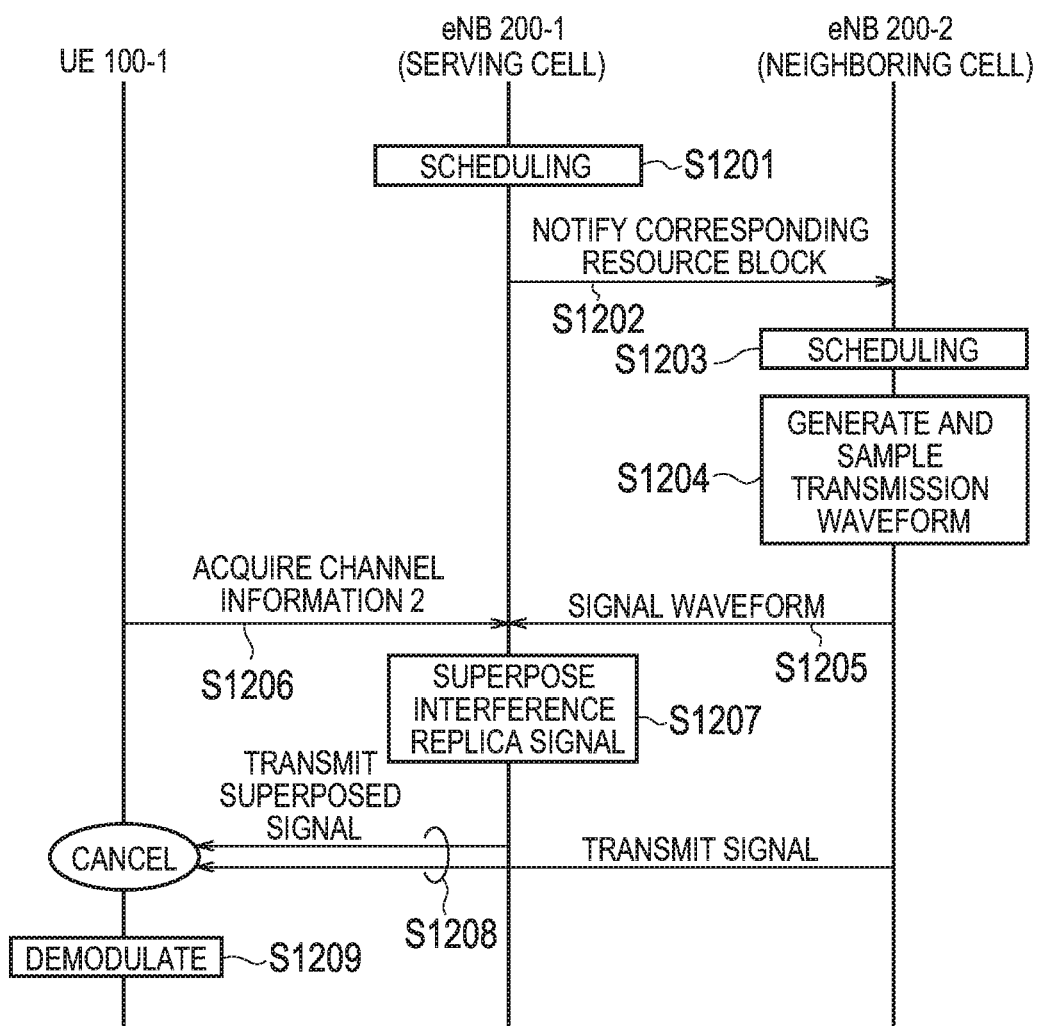
FIG. 13 is a sequence diagram of an operation information 2 according to the first embodiment.

FIG. 13 is a sequence diagram of an operation information 2 according to the present embodiment. The operation information 2 is obtained by changing a part of the operation pattern 1.

As illustrated in FIG. 13, in step S1201, the eNB 200-1 performs scheduling (or pre-scheduling) for the UE 100-1 that is connected to the cell of the eNB 200-1.

In step S1202, on the basis of a result of the scheduling, the eNB 200-1 transmits resource information indicating an assignment resource block for the UE 100-1 to the eNB 200-2. The resource information corresponds to information indicating a radio resource that is used in the transmission of a desired wave signal.

In step S1203, the eNB 200-2 performs scheduling for the UE 100-2 that is connected to the cell of the eNB 200-2.

In step S1204, on the basis of a result of the scheduling, the eNB 200-2 generates a transmission signal waveform from transmission data 2 with respect to a resource block corresponding to the resource information received from the eNB 200-1, and samples the transmission signal waveform.

In step S1205, the eNB 200-2 transmits the sampled transmission signal waveform to the eNB 200-1. Furthermore, the sampled transmission signal waveform corresponds to an interference signal waveform.

In step S1206, the eNB 200-1 acquires the channel information 2. An operation example in which the channel information 2 is acquired is the same as that of the aforementioned operation pattern 1.

In step S1207, on the basis of the channel information 2, the eNB 200-1 generates an inverse signal of a desired wave signal waveform as an interference replica signal. Then, the eNB 200-1 superposes the interference replica signal on a desired wave signal.

In step S1208, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1209, the UE 100-1 demodulates the desired wave signal included in the superposed signal.

(3) Operation Pattern 3

Figure 14:
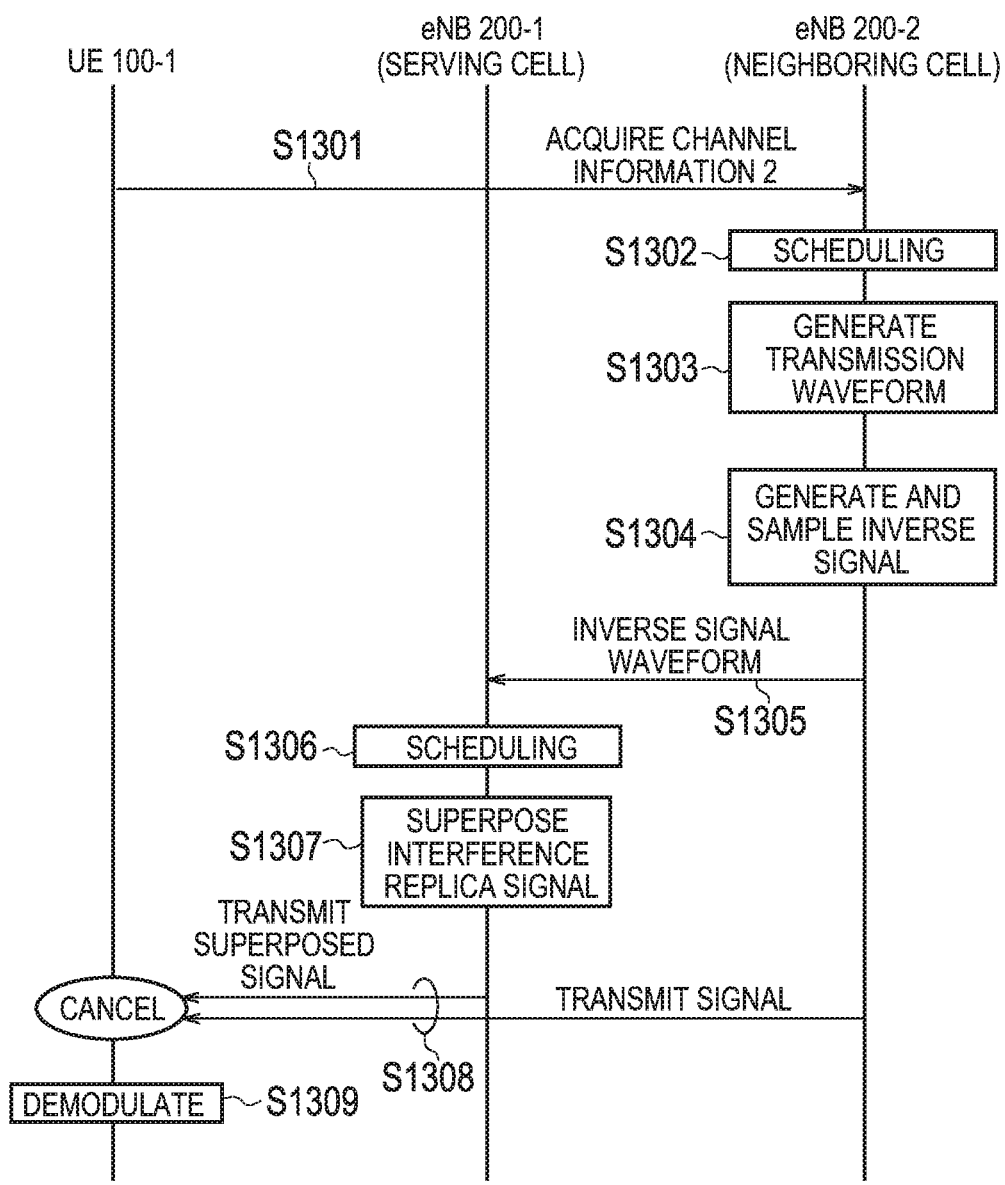
FIG. 14 is a sequence diagram of an operation information 3 according to the first embodiment.

FIG. 14 is a sequence diagram of an operation information 3 according to the present embodiment. In the operation information 3, interference wave information acquired by the eNB 200-1 indicates an inverse interference signal waveform.

As illustrated in FIG. 14, in step S1301, the eNB 200-2 acquires the channel information 2 from the UE 100-1. Alternatively, the eNB 200-2 by itself may acquire the channel information 2.

In step S1302, the eNB 200-2 performs scheduling (or pre-scheduling) for the UE 100-2 that is connected to the cell of the eNB 200-2.

In step S1303, on the basis of a result of the scheduling, the eNB 200-2 generates a transmission signal waveform (an interference wave signal waveform) from transmission data 2.

In step S1304, on the basis of the channel information 2, the eNB 200-2 generates an inverse characteristic of the interference wave signal waveform as an inverse interference waveform, and samples the inverse interference waveform.

In step S1305, the eNB 200-2 transmits the sampled inverse interference waveform to the eNB 200-1.

In addition, similarly to the aforementioned operation information 2, a waveform notification may be performed on the basis of resource information. Specifically, before step S1302, the eNB 200-1 transmits resource information indicating an assignment resource block for the UE 100-1 to the eNB 200-2, and the eNB 200-2 generates and samples a transmission signal waveform for a resource block corresponding to the resource information. In this way, it is advantageous that the amount of a signal transmitted on the X2 interface is reduced and it is enough for the eNB 200-1 simply to superpose an inverse signal.

In step S1306, the eNB 200-1 performs scheduling for the UE 100-1 that is connected to the cell of the eNB 200-1, and generates a transmission signal waveform (a desired wave signal waveform).

In step S1307, the eNB 200-1 generates an interference replica signal by the inverse interference waveform received from the eNB 200-2. Then, the eNB 200-1 superposes the interference replica signal on a desired wave signal.

In step S1308, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1309, the UE 100-1 demodulates the desired wave signal included in the superposed signal.

(4) Operation Pattern 4

Figure 15:
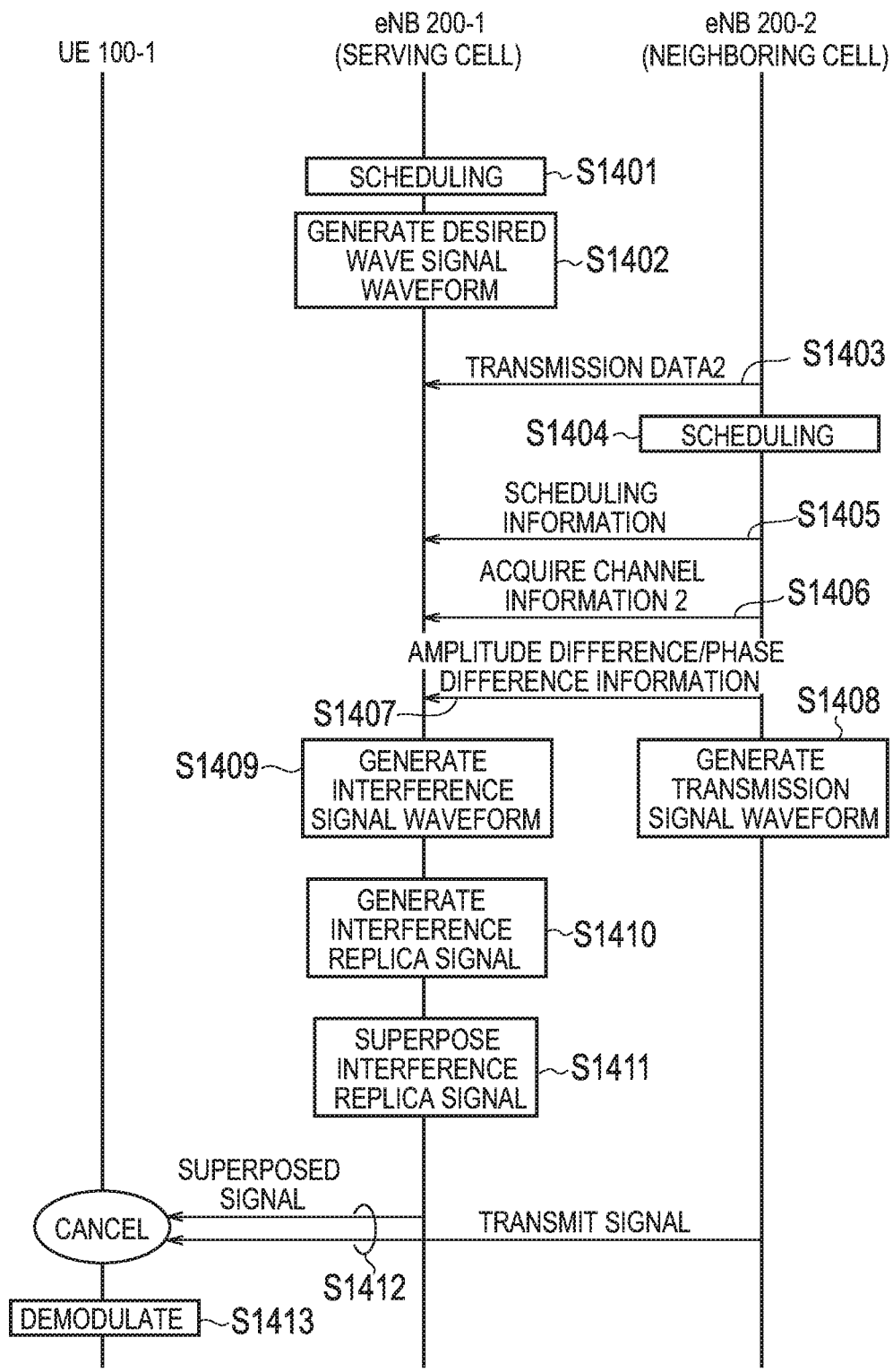
FIG. 15 is a sequence diagram of an operation information 4 according to the first embodiment.

FIG. 15 is a sequence diagram of an operation information 4 according to the present embodiment. In the operation information 4, interference wave information acquired by the eNB 200-1 indicates transmission data (transmission data 2) for the UE 100-2.

As illustrated in FIG. 15, in step S1401, the eNB 200-1 performs scheduling (or pre-scheduling) for the UE 100-1 that is connected to the cell of the eNB 200-1.

In step S1402, on the basis of a result of the scheduling, the eNB 200-1 generates a transmission signal waveform (a desired wave signal waveform) from transmission data (transmission data 1) for the UE 100-1.

In step S1403, the eNB 200-2 transmits the transmission data 2 to the eNB 200-1.

In addition, similarly to the aforementioned operation information 2, data notification may also be performed on the basis of resource information. Specifically, before step S1303, the eNB 200-1 transmits the resource information indicating an assignment resource block for the UE 100-1 to the eNB 200-2, and the eNB 200-2 transmits the transmission data 2 corresponding to the resource information to the eNB 200-2. In this way, it is possible to reduce the amount of a signal transmitted on the X2 interface.

In step S1404, the eNB 200-2 performs scheduling (or pre-scheduling) for the UE 100-2 that is connected to the cell of the eNB 200-2.

In step S1405, on the basis of a result of the scheduling, the eNB 200-2 transmits scheduling information to the eNB 200-1. The scheduling information corresponds to transmission processing information indicating the content of transmission processing when the transmission data 2 is converted into a transmission signal (an interference wave signal).

In step S1406, the eNB 200-1 acquires channel information 2. An operation, in which the eNB 200-1 acquires the channel information 2, is the same as that of the aforementioned operation pattern 1.

In step S1407, the eNB 200-2 transmits, to the eNB 200-1, difference information indicating at least one of an amplitude difference and a phase difference between a reference signal (CRS) and a data signal that are transmitted by the eNB 200-2. The eNB 200-2 may transmit difference information for each resource block to the eNB 200-1.

In addition, the transmission of the difference information from the eNB 200-2 to the eNB 200-1 is not limited to the present operation pattern, and is also applicable to the aforementioned operation patterns and operation patterns to be described later. Furthermore, as described in the aforementioned operation information 2, when the assignment resource block for the UE 100-1 is notified from the eNB 200-1 to the eNB 200-2, the eNB 200-2 may also transmit difference information only on the assignment resource block to the eNB 200-1.

In step S1408, on the basis of a result of the scheduling (step S1404), the eNB 200-2 generates a transmission signal waveform (an interference wave signal waveform) from the transmission data 2.

In step S1409, the eNB 200-1 performs transmission processing, which is indicated by the scheduling information (transmission processing information) received from the eNB 200-2, with respect to the transmission data 2 received from the eNB 200-2, thereby generating an interference signal waveform.

In step S1410, on the basis of the channel information 2, the eNB 200-1 generates an inverse signal of the interference signal waveform as an interference replica signal. At this time, on the basis of the difference information received from the eNB 200-2, the eNB 200-1 adjusts the phase and the amplitude of the interference replica signal.

In step S1411, the eNB 200-1 superposes the interference replica signal on a desired wave signal.

In step S1412, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1413, the UE 100-1 demodulates the desired wave signal included in the superposed signal.

(5) Operation Pattern 5

Figure 16:
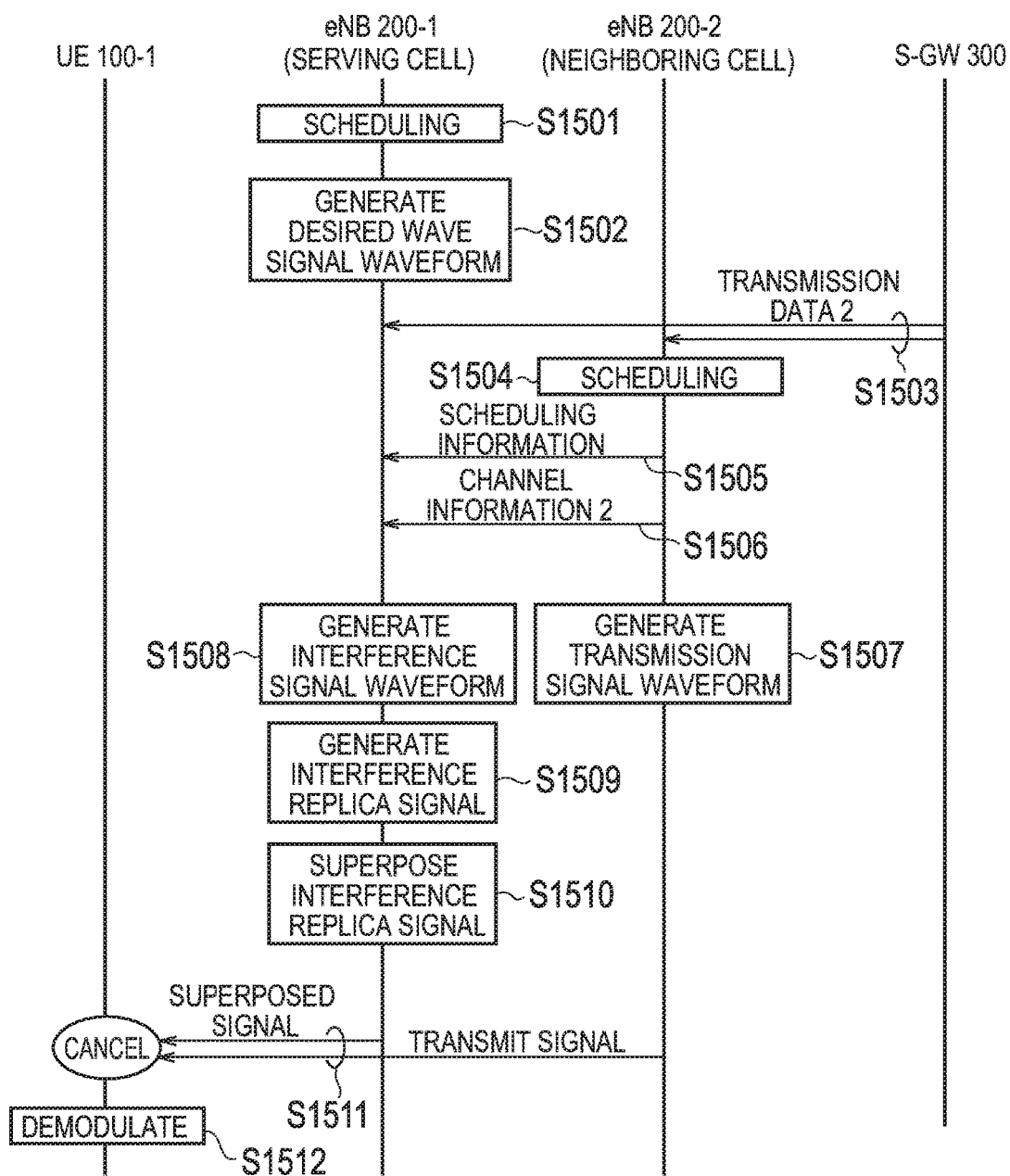
FIG. 16 is a sequence diagram of an operation information 5 according to the first embodiment.

FIG. 16 is a sequence diagram of an operation information 5 according to the present embodiment. The operation information 5 is obtained by changing a part of the operation pattern 4.

As illustrated in FIG. 16, in step S1501, the eNB 200-1 performs scheduling (or pre-scheduling) for the UE 100-1 that is connected to the cell of the eNB 200-1.

In step S1502, on the basis of a result of the scheduling, the eNB 200-1 generates a transmission signal waveform (a desired wave signal waveform) from transmission data (transmission data 1) for the UE 100-1.

In step S1503, the S-GW 300 transmits the transmission data 2 to the eNB 200-1 and the eNB 200-2. In the present operation pattern, the S-GW 300 corresponds to a management device.

In step S1504, the eNB 200-2 performs scheduling (or pre-scheduling) for the UE 100-2 that is connected to the cell of the eNB 200-2.

In step S1505, on the basis of a result of the scheduling, the eNB 200-2 transmits scheduling information to the eNB 200-1. The scheduling information corresponds to transmission processing information indicating the content of transmission processing when the transmission data 2 is converted into a transmission signal (an interference wave signal).

In step S1506, the eNB 200-1 acquires channel information 2. An operation, in which the eNB 200-1 acquires the channel information 2, is the same as that of the aforementioned operation pattern 1.

In step S1507, on the basis of a result of the scheduling (step S1504), the eNB 200-2 generates a transmission signal waveform (an interference wave signal waveform) from the transmission data 2.

In step S1508, the eNB 200-1 performs transmission processing, which is indicated by the scheduling information (transmission processing information) received from the eNB 200-2, with respect to the transmission data 2 received from the eNB 200-2, thereby generating an interference signal waveform.

In step S1509, on the basis of the channel information 2, the eNB 200-1 generates an inverse signal of the interference signal waveform as an interference replica signal.

In step S1510, the eNB 200-1 superposes the interference replica signal on a desired wave signal.

In step S1511, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1512, the UE 100-1 demodulates the desired wave signal included in the superposed signal.

(6) Operation Pattern 6

Figure 17:
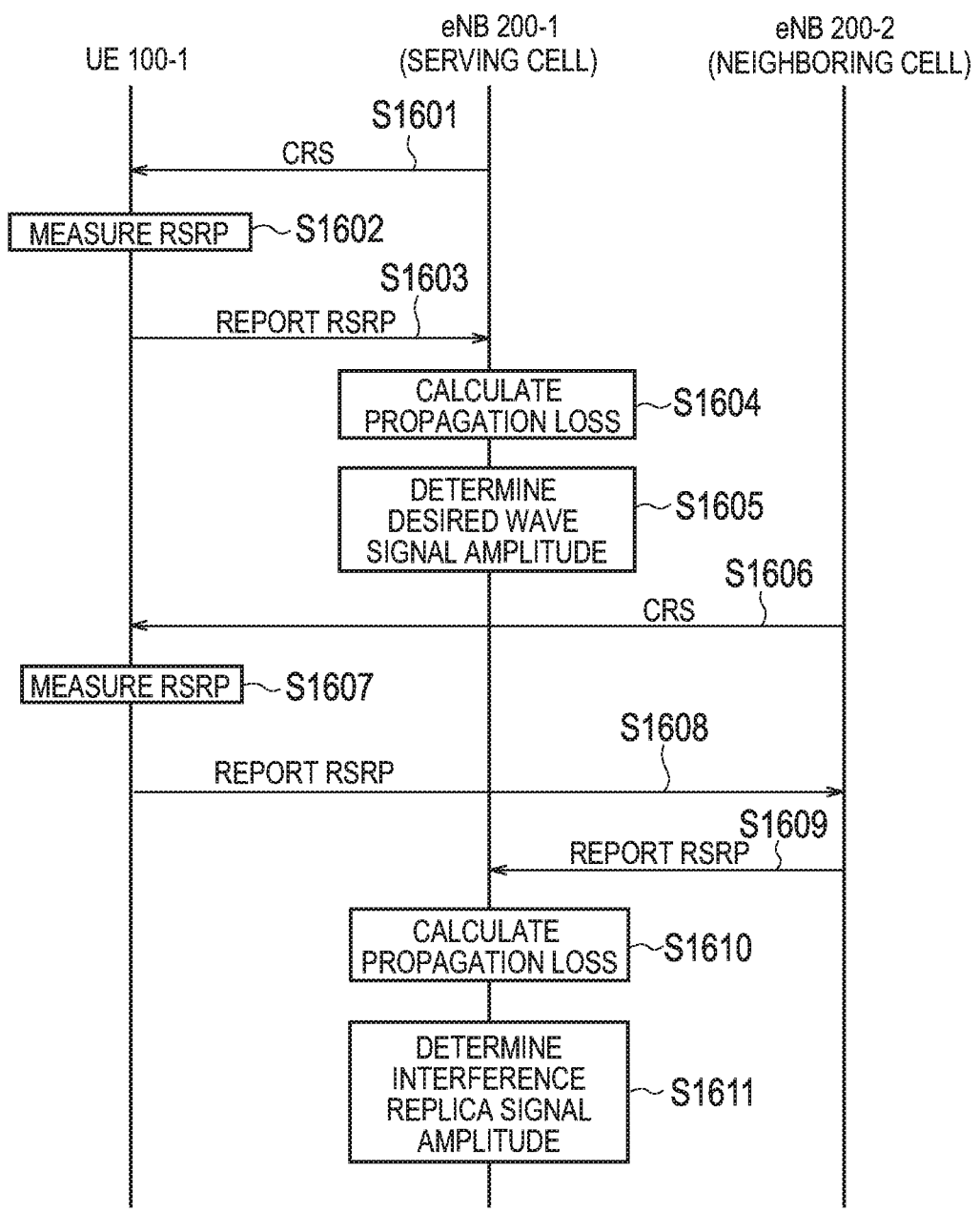
FIG. 17 is a sequence diagram of an operation information 6 according to the first embodiment.

FIG. 17 is a sequence diagram of an operation information 6 according to the present embodiment. The operation information 6 is an operation pattern for appropriately adjusting the amplitude of an interference replica signal. The operation information 6 is performed through a combination with any one of the aforementioned operation patterns 1 to 5.

As illustrated in FIG. 17, in step S1601, the eNB 200-1 transmits a reference signal (CRS). The UE 100-1 receives the CRS.

In step S1602, the UE 100-1 measures the received power (RSRP1) of the CRS received from the eNB 200-1.

In step S1603, the UE 100-1 transmits the RSRP1 to the eNB 200-1.

In step S1604, the eNB 200-1 subtracts the RSRP1 from the transmission power of the CRS, thereby calculating propagation loss (propagation loss 1) between the UE 100-1 and the eNB 200-1.

In step S1605, on the basis of the propagation loss 1, the eNB 200-1 adjusts the amplitude of a desired wave signal.

In step S1606, the eNB 200-2 transmits the CRS. The UE 100-1 receives the CRS.

In step S1607, the UE 100-1 measures the received power (RSRP2) of CRS received from the eNB 200-2.

In step S1608, the UE 100-1 transmits the RSRP2 to the eNB 200-2.

In step S1609, the eNB 200-2 transfers the RSRP2 received from the UE 100-1 to the eNB 200-1. Furthermore, the eNB 200-2 may transfer the RSRP2 to the eNB 200-1 in response to a pre-request from the eNB 200-1.

In addition, the UE 100-1 may not transmit the RSRP2 to the eNB 200-2, but directly transmit the RSRP2 to the eNB 200-1.

In step S1610, the eNB 200-1 subtracts the RSRP2 from the transmission power of the CRS, thereby calculating propagation loss (propagation loss 2) between the UE 100-1 and the eNB 200-2.

In step S1611, on the basis of the propagation loss 2, the eNB 200-1 adjusts the amplitude of an interference replica signal.

In addition, when the eNB 200-1 and/or the eNB 200-2 transmits a reference signal (specifically, CSI-RS) other than the CRS, the UE 100-1 may also measure the received power of the CSI-RS, and may transmit the received power of the CSI-RS to the eNB 200-1 or the eNB 200-2. In this case, information indicating the type (the CRS or the CSI-RS) of the received power may be added.

(7) Operation Pattern 7

Figure 18:
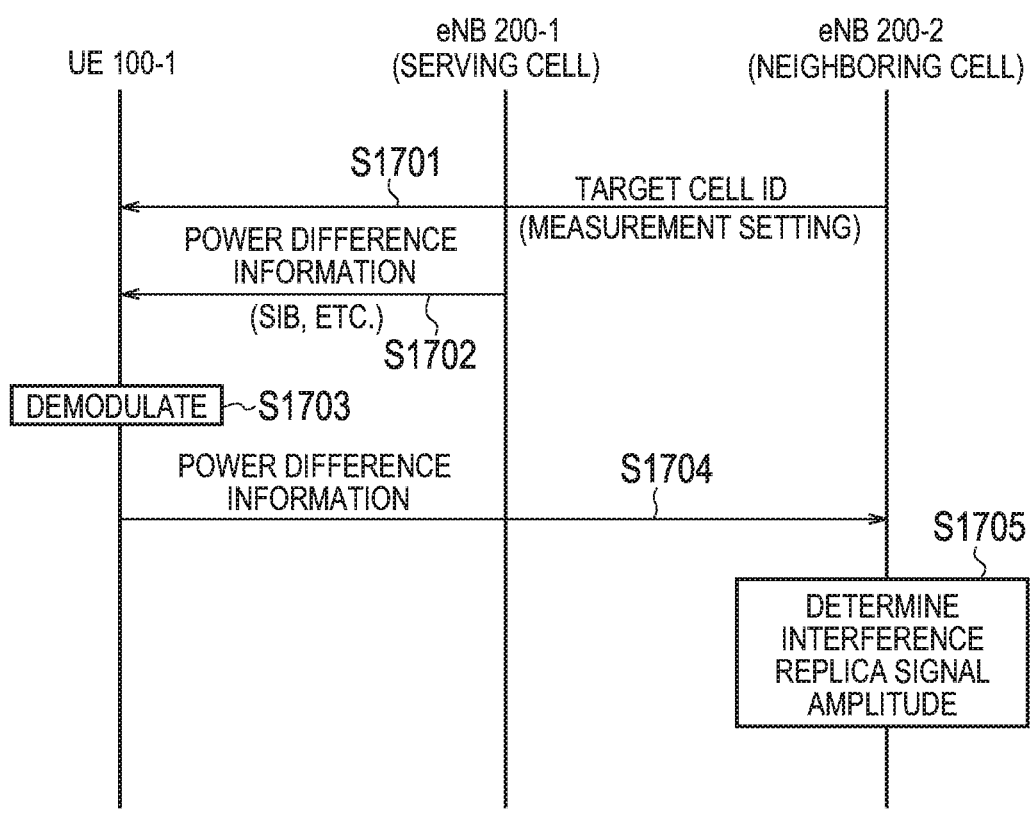
FIG. 18 is a sequence diagram of an operation information 7 according to the first embodiment.

FIG. 18 is a sequence diagram of an operation information 7 according to the present embodiment. The operation information 7 is an operation pattern for appropriately adjusting the amplitude of an interference replica signal. The operation information 7 is performed through a combination with any one of the aforementioned operation patterns 1 to 5.

As illustrated in FIG. 18, in step S1701, the eNB 200-1 transmits an identifier (a cell ID) of a neighboring cell (a cell managed by the eNB 200-2) to the UE 100-1.

In step S1702, on the basis of the cell ID received from the eNB 200-1, the UE 100-1 receives system information (SIB; System Information Block) that is transmitted by the eNB 200-2. In the present operation pattern, the SIB includes power difference information indicating a power difference (a transmission power difference) between a reference signal and a data signal that is transmitted by the eNB 200-2.

In step S1703, the UE 100-1 demodulates the SIB to acquire the power difference information included in the SIB.

In step S1704, the UE 100-1 transmits the power difference information to the eNB 200-1.

In step S1705, on the basis of the power difference information received from the UE 100-1, the eNB 200-1 adjusts the amplitude of an interference replica signal.

In addition, in the present operation pattern, the power difference information is transmitted from the eNB 200-2 to the eNB 200-1 via the UE 100-1. However, the power difference information may be directly transmitted from the eNB 200-2 to the eNB 200-1. In this case, the eNB 200-2 may also transmit the power difference information to the eNB 200-1 in response to a request from the eNB 200-1.

(8) Operation Pattern 8

Figure 19:
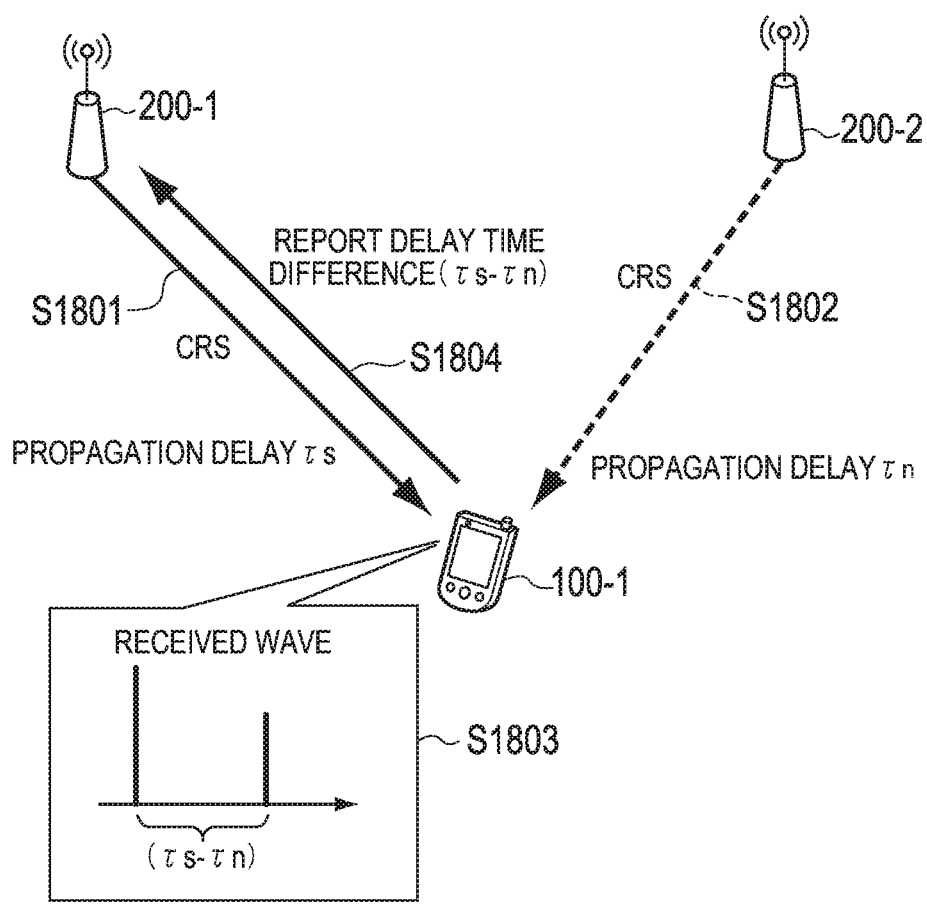
FIG. 19 is a sequence diagram of an operation information 8 according to the first embodiment.

FIG. 19 is a sequence diagram of an operation information 8 according to the present embodiment. The operation information 8 is an operation pattern for appropriately adjusting the transmission timing (the superposition timing) of an interference replica signal. The operation information 8 is performed through a combination with any one of the aforementioned operation patterns 1 to 5.

As illustrated in FIG. 19, in step S1801, the eNB 200-1 transmits a reference signal (CRS). The CRS transmitted by the eNB 200-1 is received in the UE 100-1 after propagation delay τS.

In step S1802, the eNB 200-2 transmits CRS simultaneously with the transmission of the CRS by the eNB 200-1. The CRS transmitted by the eNB 200-2 is received in the UE 100-1 after propagation delay τn.

In step S1803, the UE 100-1 generates a difference between the reception timing of the CRS from the eNB 200-1 and the reception timing of the CRS from the eNB 200-2 as time difference information. That is, the time difference information is information indicating a delay time difference between the delay time τS from the eNB 200-1 to the UE 100-1 and the delay time τn from the eNB 200-2 to the UE 100-1.

In step S1804, the UE 100-1 transmits the time difference information to the eNB 200-1. On the basis of the time difference information received from the UE 100-1, the eNB 200-1 adjusts the transmission timing (the superposition timing) of an interference replica signal.

In addition, in the present operation pattern, the eNB 200-1 and the eNB 200-2 simultaneously transmit the CRS. However, when the transmission timings of the CRS are different from each other, it is sufficient if transmission timing difference information is shared by the eNB 200-1 and the eNB 200-2 and the time difference information received from the UE 100-1 is corrected. Alternatively, when the UE 100-1 side knows the transmission timing difference information (a difference between subframe numbers, a difference between symbol numbers, and the like), the UE 100-1 may correct the information and report a delay time difference.

Furthermore, in the present operation pattern, the CRS is used as the reference signal. However, instead of the CRS, CSI-RS may be used. Moreover, the UE 100-1 may also transmit information indicating a difference between the received power of the CRS from the eNB 200-1 and the received power of the CRS from the eNB 200-2, together with the time difference information.

[Second Embodiment]

Hereinafter, a second embodiment will be described while focusing on differences from the aforementioned first embodiment.

The first embodiment has described that the coordinated interference cancellation scheme is effective also in terms of the enhancement of communication security.

Figure 20:
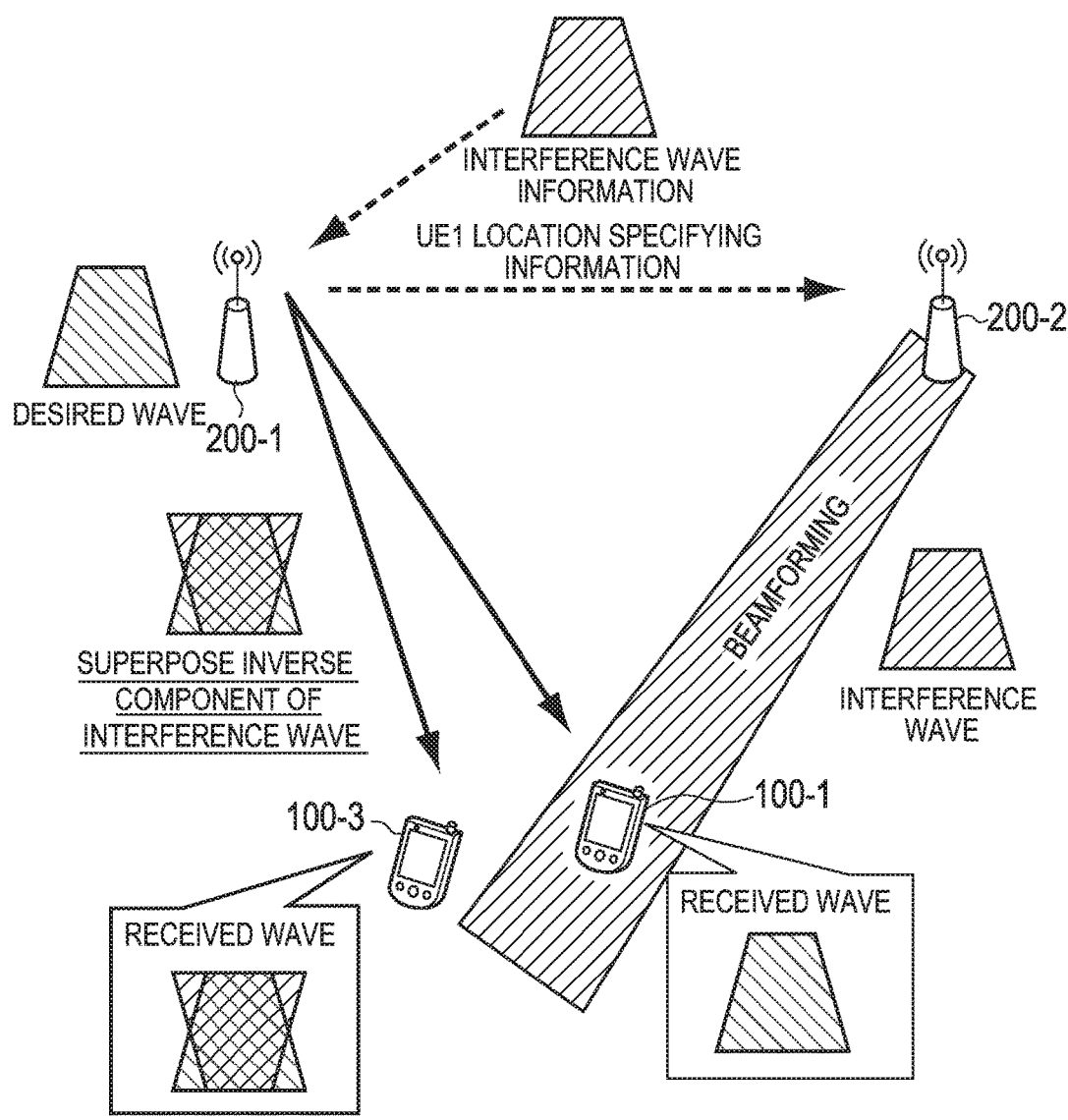
FIG. 20 is a diagram for explaining an operation according to the second embodiment.

The second embodiment is an embodiment for further enhancing the communication security. FIG. 20 is a diagram for explaining an operation according to the second embodiment.

As illustrated in FIG. 20, an operation environment according to the second embodiment is the same as that of the first embodiment. Furthermore, UE 100-3 is connected to the cell of the eNB 200-1.

Firstly, the eNB 200-1 notifies the eNB 200-2 of location information on the location of the UE 100-1 that is an object of the coordinated interference cancellation scheme. The location information may be GNSS information acquired from the UE 100-1 or an identifier (a cell ID) of a serving cell of the UE 100-1. Alternatively, the location information may be location information acquired from a location management device (E-SMLC; Evolved Serving Mobile Location Centre).

Next, on the basis of the location information of the UE 100-1, the eNB 200-2 increases the received power of an interference wave signal in the location of the UE 100-1. For example, the eNB 200-2 directs a transmission beam toward the location of the UE 100-1 or the serving cell of the UE 100-1 through beamforming. Alternatively, the eNB 200-2 may increase transmission power in a cell nearest the UE 100-1.

As described above, since the interference replica signal is generated to have an amplitude equal to the amplitude of the interference wave signal received in the UE 100-1, the eNB 200-1 increases the transmission power of the interference replica signal in response to an increase in the received power of the interference wave signal.

In this way, although the interference replica signal is offset by the interference wave signal in the location of the UE 100-1, the interference replica signal remains in a location (for example, the location of the UE 100-3) other than the location of the UE 100-1. Furthermore, as the power of the interference replica signal is large, it is difficult to demodulate a desired wave signal. Accordingly, even though the UE 100-3 intends to intercept a desired wave signal to the UE 100-1, since the UE 100-3 is not able to demodulate the desired wave signal, the UE 100-3 is not able to intercept the desired wave signal.

In addition, in the present embodiment, the eNB 200-2 directs a transmission beam toward the UE 100-1. However, if it is possible to designate the location of the UE 100-3 that intends to intercept the desired wave signal to the UE 100-1, the eNB 200-2 may also direct the transmission beam toward the UE 100-3.

[Third Embodiment]

Hereinafter, a third embodiment will be described while focusing on differences from the aforementioned first embodiment.

In the coordinated interference cancellation scheme, since high accuracy is required for phase adjustment and amplitude adjustment of the interference replica signal, an error rate may increase as compared with normal communication. In the case in which the error rate increases, since the frequency of retransmission also increases, when high QoS (for example, low delay and the like) is required, it is probable that it is not possible to satisfy the QoS.

In this regard, in the embodiment, on the basis of QoS required for the communication of the UE 100-1, the eNB 200-1 determines whether to perform superposition transmission in which the interference replica signal is superposed on the desired wave signal (whether to apply the coordinated interference cancellation scheme).

Figure 21:
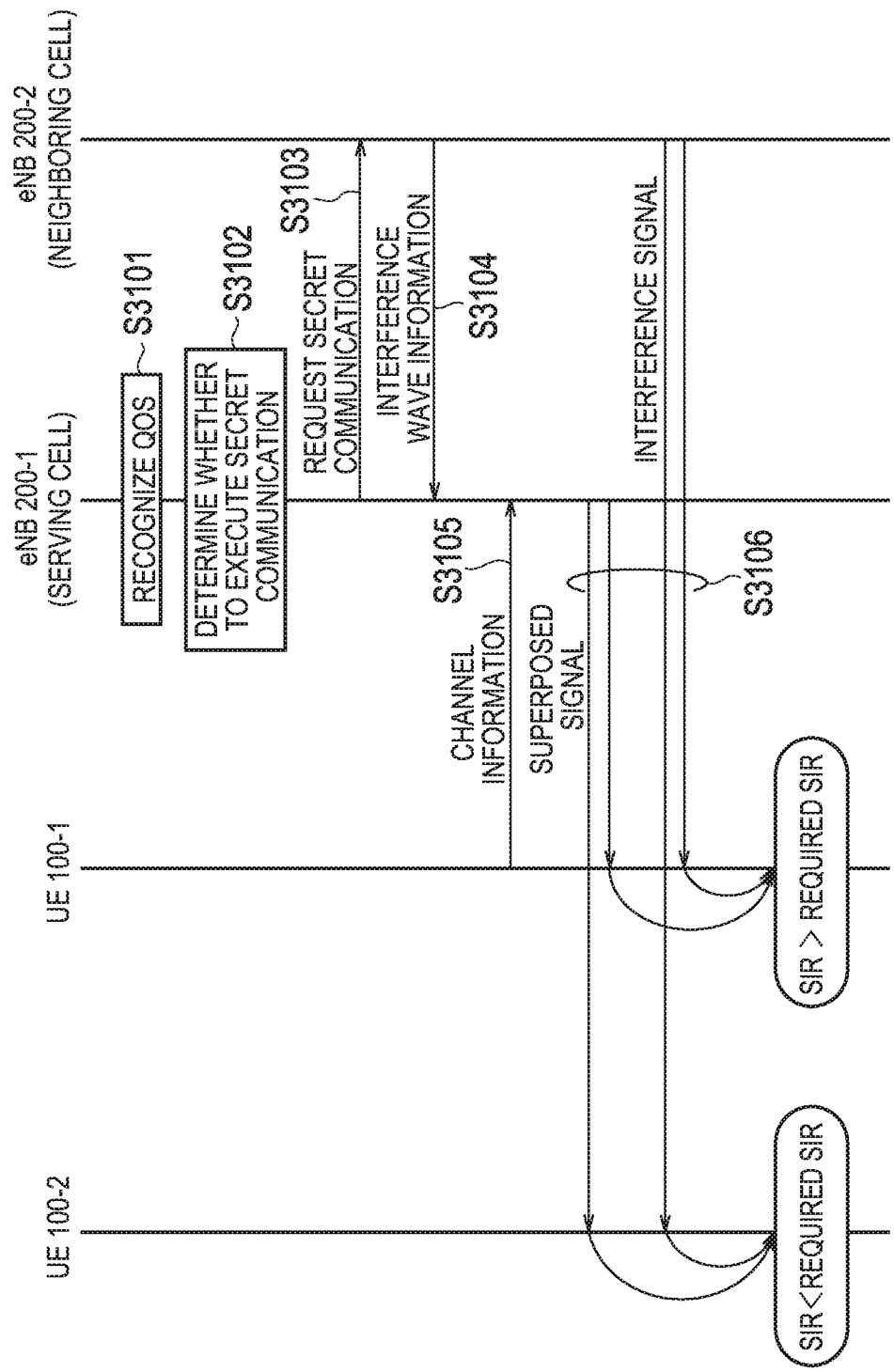
FIG. 21 is an operation sequence diagram according to a third embodiment.

FIG. 21 is an operation sequence diagram according to the present embodiment.

As illustrated in FIG. 21, in step S3101, the eNB 200-1 recognizes QoS required by the UE 100-1. Furthermore, the QoS required by the UE 100-1 can be determined by the type of a bearer.

In step S3102, on the basis of the QoS required by the UE 100-1, the eNB 200-1 determines whether to apply the coordinated interference cancellation scheme. When the QoS is higher than a threshold value, the eNB 200-1 determines not to apply the coordinated interference cancellation scheme (secret communication). On the other hand, when the QoS is equal to or less than the threshold value, the eNB 200-1 determines to apply the coordinated interference cancellation scheme (the secret communication). Hereinafter, a description will be given on the assumption that it was determined to apply the coordinated interference cancellation scheme (the secret communication).

In step S3103, the eNB 200-1 transmits, to the eNB 200-2, a request indicating that the coordinated interference cancellation scheme (the secret communication) is applied.

In step S3104, the eNB 200-2 transmits interference wave information to the eNB 200-1 in response to the request from the eNB 200-1.

In step S3105, the eNB 200-1 acquires channel information 2 by using a method equal to that of the first embodiment.

In step S3106, the eNB 200-2 performs transmission to UE connected to the cell of the eNB 200-2. The UE 100-1 and the UE 100-3 receive a signal from the eNB 200-2 as an interference wave signal. Meanwhile, the eNB 200-1 transmits a superposed signal to the UE 100-1. The UE 100-1 receives the superposed signal.

Furthermore, in the UE 100-1, the interference wave signal is canceled by an interference replica signal included in the superposed signal. Accordingly, since received SIR satisfies desired SIR, it is possible to demodulate the required wave signal. Meanwhile, in the UE 100-3, the interference replica signal included in the superposed signal is not canceled. Accordingly, since the received SIR does not satisfy the desired SIR, it is not possible to demodulate the required wave signal.

[Modifications of First to Third Embodiments]

In the aforementioned third embodiment, on the basis of the QoS required by the UE 100-1, the eNB 200-1 determines whether to apply the coordinated interference cancellation scheme (the secret communication). However, on the basis of a security level (a required security level) required for the communication of the UE 100-1, the eNB 200-1 may determine whether to apply the coordinated interference cancellation scheme (the secret communication). The required security level can be determined on the basis of a notification from the UE 100-1 or the type of an application that is performed by the UE 100-1. When the required security level is higher than a threshold value, the eNB 200-1 determines to apply the coordinated interference cancellation scheme (the secret communication). On the other hand, when the required security level is equal to or less than the threshold value, the eNB 200-1 determines not to apply the coordinated interference cancellation scheme (the secret communication).

In the aforementioned first to third embodiments, the serving cell and the neighboring cell are managed by different eNBs (the eNB 200-1 and the eNB 200-2). However, the serving cell and the neighboring cell may be managed by the same eNB (the eNB 200-1).

The aforementioned first to third embodiments have described an example in which the present disclosure is applied to the LTE system. However, the present disclosure may also be applied to systems, other than the LTE system, as well as the LTE system. For example, the present disclosure may be applied to systems adopting schemes such as CDMA (Code Division Multiple Access) or IDMA (Interleave Division Multiple Access).

[Fourth Embodiment]

Hereinafter, a fourth embodiment will be described while focusing on differences from the aforementioned first embodiment.

The first embodiment has mainly described interference cancellation using an interference replica signal and has not particularly mentioned the demodulation of the desired wave signal in the UE 100-1. However, in the fourth embodiment, the demodulation of the desired wave signal in the UE 100-1 will be described.

In the coordinated interference cancellation scheme, since the interference replica signal is superposed on the desired wave signal and the transmission power of the desired wave signal is lower than the transmission power of a reference signal (CRS or CSI-RS), it is difficult for the UE 100-1 to demodulate the desired wave signal.

For example, when QAM modulation is applied to the desired wave signal, the UE 100-1 determines an amplitude of a received desired wave signal on the basis of an amplitude of a received reference signal. Accordingly, when the transmission power of the desired wave signal is lower than the transmission power of the reference signal, the UE 100-1 is not able to normally determine the amplitude of the received desired wave signal.

In this regard, in the present embodiment, when the coordinated interference cancellation scheme is applied, the eNB 200-1 notifies the UE 100-1 of power difference information on a transmission power difference between the desired wave signal and the reference signal.

The power difference information is a value indicating a transmission power difference. Alternatively, the power difference information is a flag indicating that the transmission power difference exists. When the power difference information is the flag, information (for example, 3 dB and the like in the worst case) indicating the size of the transmission power difference needs to be shared in advance by the eNB 200-1 and the UE 100-1.

Furthermore, when the power difference information on the transmission power difference between the desired wave signal and the reference signal was received from the serving cell, the UE 100-1 controls the demodulation of the desired wave signal on the basis of the power difference information. For example, the UE 100-1 performs the demodulation after correcting the amplitude of the received desired wave signal in response to the power difference information.

Consequently, according to the present embodiment, in the coordinated interference cancellation scheme, the interference replica signal is superposed on the desired wave signal, so that it is possible to easily demodulate the desired wave signal even when the transmission power of the desired wave signal is lower than that of the reference signal.

FIG. 22 is an operation sequence diagram according to the present embodiment.

As illustrated in FIG. 22, in step S4101, the eNB 200-1 performs scheduling for the UE 100-1 that is connected to the cell of the eNB 200-1.

In step S4102, on the basis of a result of the scheduling, the eNB 200-1 generates a transmission signal (a desired wave signal) from transmission data 1. Furthermore, the desired wave signal, for example, is transmitted on a physical downlink shared channel (PDSCH). However, a channel other then the PDSCH may be used if the channel is a channel to which interference cancellation is applied.

In step S4103, the eNB 200-1 transmits CRS. Furthermore, it is noted that the CRS is transmitted with an amplitude (power) decided in advance.

In step S4104, the eNB 200-1 determines whether there is a power difference between transmission power $P_{CRS}$ of the CRS and transmission power $P_{PDSCH}$ of the PDSCH.

When a determination result of step S4104 is "YES", the eNB 200-1 notifies the UE 100-1 of power difference information in step S4105. In the example of FIG. 22, the power difference information is a value indicating a difference ($P_{CRS}-P_{PDSCH}$) between $P_{CRS}$ and $P_{PDSCH}$, or a flag. Then, the procedure proceeds to step S4106.

In step S4106, the eNB 200-1 transmits, to the UE 100-1, a desired wave signal (a superposed signal) superposed with an interference replica signal on the PDSCH.

[Modification of Fourth Embodiment]

In the aforementioned fourth embodiment, the serving cell and the neighboring cell are managed by different eNBs (the eNB 200-1 and the eNB 200-2). However, the serving cell and the neighboring cell may be managed by the same eNB (the eNB 200-1).

The aforementioned fourth embodiment has described an example in which the present disclosure is applied to the LTE system. However, the present disclosure may also be applied to systems other than the LTE system, as well as the LTE system. For example, the present disclosure may be applied to systems adopting schemes such as CDMA or IDMA.

[Fifth Embodiment]

Hereinafter, a fifth embodiment will be described while focusing on differences from the aforementioned first embodiment.

The first embodiment has described that the interference wave signal transmitted by the eNB 200-2 is canceled using the interference replica signal transmitted by the eNB 200-1.

The fifth embodiment is an embodiment in which the coordinated interference cancellation scheme described in the first embodiment is applied. FIG. 23 is a diagram for explaining an operation according to the present embodiment.

As illustrated in FIG. 23, an operation environment according to the present embodiment is the same as that of the first embodiment. Furthermore, also in the present embodiment, the aforementioned coordinated interference cancellation scheme is applied.

Moreover, in the present embodiment, the eNB 200-2 generates a desired wave replica signal corresponding to a desired wave signal and superposes the desired wave replica signal on an interference wave signal. Furthermore, the eNB 200-1 generates the desired wave replica signal such that the desired wave replica signal received in the UE 100-1 is synthesized with the desired wave signal received in the UE 100-1. Then, the eNB 200-2 transmits the interference wave signal superposed with the desired wave replica signal. According to such a scheme, it is possible to increase the received power of the desired wave signal in the UE 100-1, so that it is possible to improve SIR.

Meanwhile, since the UE 100-2 receives a signal from the eNB 200-2 as a desired wave signal, when the transmission power of the desired wave replica signal is high, it is not possible to satisfy required reception quality (required CN and the like) of the UE 100-2. Accordingly, the eNB 200-2 sets the transmission power of the desired wave replica signal to be lower than the transmission power of the interference wave signal such that required reception quality of the eNB 200-2 is satisfied.

A procedure for generating the desired wave replica signal in the eNB 200-2 is a procedure that is the same as a process for generating the interference replica signal in the eNB 200-1. For example, in the replica generation process in the first embodiment, it is sufficient if interference wave information is regarded as desired wave information, channel information 2 is regarded as channel information 1, and this information is applied for the generation of the desired wave replica signal.

However, the interference replica signal is generated to be received in an inverse phase relative to the interference wave signal. However, there is a difference that the desired wave replica signal is generated to be received in the same phase as that of the interference wave signal. Furthermore, the interference replica signal is generated to be received in the same amplitude as that of the interference wave signal. However, there is a difference that the desired wave replica signal is generated to be received in an amplitude (power) sufficiently reduced.

FIG. 24 is an operation sequence diagram according to the present embodiment.

As illustrated in FIG. 24, in step S5101, the eNB 200-2 transmits interference wave information corresponding to an interference wave signal to the eNB 200-1. The eNB 200-1 generates an interference replica signal in the same manner as that of the first embodiment.

In step S5102, the eNB 200-1 transmits desired wave information corresponding to a desired wave signal to the eNB 200-2. The eNB 200-2 generates a desired wave replica signal on the basis of the desired wave information, channel information 1 and the like.

In step S5103, the eNB 200-1 transmits a desired wave signal (a superposed signal 1) superposed with the interference replica signal to the UE 100-1. Furthermore, the eNB 200-1 assigns ½ of transmission power to the desired wave signal and assigns ½ of the transmission power to the interference replica signal.

In step S5103, the eNB 200-2 transmits an interference wave signal (a superposed signal 2) superposed with the desired wave replica signal to the UE 100-2. Furthermore, the eNB 200-2 assigns ⅞ of transmission power to the interference wave signal and assigns ⅛ of the transmission power to the desired wave replica signal.

In step S5104a, the UE 100-1 receives the superposed signals 1 and 2. As a consequence, the interference wave signal is canceled and the received power of the desired wave signal increases. Then, in step S5105a, the UE 100-1 is able to demodulate the desired wave signal.

Meanwhile, in step S5104b, the UE 100-2 receives the superposed signal 2. Furthermore, since the interference wave signal (a desired wave signal of the UE 100-2) included in the superposed signal 2 satisfies required reception quality, the UE 100-2 is able to demodulate the interference wave signal (the desired wave signal of the UE 100-2) in step S5105b.

[Modification of Fifth Embodiment]

In the aforementioned fifth embodiment, the serving cell and the neighboring cell are managed by different eNBs (the eNB 200-1 and the eNB 200-2). However, the serving cell and the neighboring cell may be managed by the same eNB (the eNB 200-1).

The aforementioned fifth embodiment has described an example in which the present disclosure is applied to the LTE system. However, the present disclosure may also be applied to systems other than the LTE system, as well as the LTE system. For example, the present disclosure may be applied to systems adopting schemes such as CDMA or IDMA.

CROSS REFERENCE

The entire contents of U.S. Provisional Application No. 61/740989 (filed on Dec. 21, 2012), U.S. Provisional Application No. 61/745016 (filed on Dec. 21, 2012), and U.S. Provisional Application No. 61/745043 (filed on Dec. 21, 2012) are incorporated herein by reference.

INDUSTRIAL APPLICABILITY

The present disclosure is useful for mobile communication fields.

The invention claimed is:

1. A first base station, which manages a serving cell of a user terminal, comprising:
a receiver configured to receive transmission data, transmission characteristics information and transmission power information from a second base station which manages a neighboring cell of the serving cell, wherein the transmission characteristics information includes transmission processing information indicating content of transmission processing performed by the second base station when converting the transmission data into a transmission signal, the transmission power information indicates parameters configured for determining a ratio of transmission power of a data signal transmitted by the second base station to transmission power of a Cell-specific Reference Signal (CRS) transmitted by the second base station;
a controller configured to generate interference cancelling information on the basis of the received transmission characteristics information and the received transmission power information, the interference cancelling information being configured for mitigating interference caused by the data signal and the CRS transmitted from the second base station received by the user terminal; and
a transmitter configured to transmit the interference cancelling information to the user terminal by dedicated signaling.

2. A first base station, which manages a serving cell of a user terminal, comprising:
a receiver configured to receive transmission data, transmission characteristics information and transmission power information from a second base station that manages a neighboring cell of the serving cell, wherein the transmission characteristics information includes transmission processing information indicating content of transmission processing performed by the second base station when converting the transmission data into a transmission signal, the transmission power information indicates a relation between transmission power of a data signal transmitted by the second base station and transmission power of a Cell-specific Reference Signal (CRS) transmitted by the second base station;
a controller configured to generate interference cancelling information on the basis of the received transmission characteristics information and the received transmission power information, the interference cancelling information being configured for mitigating interference caused by the data signal and the CRS transmitted from the second base station received by the user terminal; and
a transmitter configured to transmit the interference cancelling information to the user terminal by dedicated signaling.

3. A communication control method used in a first base station, comprising:
receiving transmission data, transmission characteristics information and transmission power information from a second base station which manages a neighboring cell of a serving cell managed by the first base station, wherein the transmission characteristics information includes transmission processing information indicating content of transmission processing performed by the second base station when converting the transmission data into a transmission signal, the transmission power information indicates parameters configured for determining a ratio of transmission power of a data signal transmitted by the second base station to transmission power of a Cell-specific Reference Signal (CRS) transmitted by the second base station;
generating interference cancelling information on the basis of the received transmission characteristics information and the received transmission power information, the interference cancelling information being configured for mitigating interference caused by the data signal and the CRS transmitted from the second base station received by a user terminal served by the serving cell; and
transmitting the interference cancelling information to the user terminal by dedicated signaling.

* * * * *